US008195348B2

(12) United States Patent
Mizutani et al.

(10) Patent No.: US 8,195,348 B2
(45) Date of Patent: Jun. 5, 2012

(54) DRIVING POWER CONTROL APPARATUS FOR FOUR WHEEL DRIVE VEHICLE

(75) Inventors: Ryoji Mizutani, Nishikamo-gun (JP); Michitaka Tsuchida, Susono (JP); Yasuaki Tahara, Nagoya (JP); Tomohiro Fukushima, Kariya (JP); Masafumi Sakuma, Chiryu (JP)

(73) Assignees: Toyota Jidosha Kabushiki Kaisha, Toyota (JP); Aisin Seiki Kabushiki Kaisha, Kariya-Shi (JP)

( * ) Notice: Subject to any disclaimer, the term of this patent is extended or adjusted under 35 U.S.C. 154(b) by 485 days.

(21) Appl. No.: 12/226,821

(22) PCT Filed: May 18, 2007

(86) PCT No.: PCT/JP2007/060664
§ 371 (c)(1),
(2), (4) Date: Oct. 29, 2008

(87) PCT Pub. No.: WO2007/136122
PCT Pub. Date: Nov. 29, 2007

(65) Prior Publication Data
US 2009/0088914 A1 Apr. 2, 2009

(30) Foreign Application Priority Data
May 24, 2006 (JP) .................................. 2006-144113

(51) Int. Cl.
*B60L 11/02* (2006.01)
*B60W 20/00* (2006.01)
*B60W 10/08* (2006.01)
(52) U.S. Cl. ..................................... 701/22; 180/65.265
(58) Field of Classification Search .................... 701/22, 701/69, 54, 89; 477/3, 7
See application file for complete search history.

(56) References Cited

U.S. PATENT DOCUMENTS
5,453,930 A    9/1995  Imaseki et al.
5,472,265 A   12/1995  Ohnuma
(Continued)

FOREIGN PATENT DOCUMENTS
JP    A-2-133005    5/1990
(Continued)

OTHER PUBLICATIONS
Sakai et al., Motion Control in an Electric Vehicle with Four Independently Driven In-Wheel Motors, Mar. 1999, IEEE/ASME Transactions on Mechatronics, vol. 4, No. 1, pp. 9-16.*

*Primary Examiner* — Thomas Black
*Assistant Examiner* — Sara Lewandroski
(74) *Attorney, Agent, or Firm* — Oliff & Berridge, PLC

(57) ABSTRACT

Front left and right wheel units are driven by an engine and a motor generator. Rear left and right wheel units are independently driven by in-wheel motor type motor generators. The motor generator and the motor generator are configured to have different rated outputs, respectively, and be subjected to different speed reduction ratios, respectively, between the motor generators and their respectively associated drive wheel units, and thus have characteristics, respectively, in efficiency with respect to torque and vehicular speed, that exhibit high efficiency in mutually different output ranges, respectively. When a mileage oriented mode is selected as a traveling mode, an ECU determines how a drive torque should be allocated between the motor generators, as based on the motors' required drive torque and vehicular speed and on each motor generator's characteristic in efficiency, to maximize the motor generators' total efficiency.

11 Claims, 14 Drawing Sheets

U.S. PATENT DOCUMENTS

| | | | |
|---|---|---|---|
| 5,549,172 A | | 8/1996 | Mutoh et al. |
| 5,947,855 A | * | 9/1999 | Weiss .............................. 475/5 |
| 6,971,461 B2 | * | 12/2005 | Yamamoto et al. ........ 180/65.25 |
| 7,305,294 B2 | * | 12/2007 | Bate et al. ........................ 701/93 |
| 2003/0064854 A1 | * | 4/2003 | Kotani .............................. 477/3 |
| 2004/0050597 A1 | * | 3/2004 | Ai et al. ........................ 180/65.2 |
| 2005/0272556 A1 | * | 12/2005 | Hiroe et al. ........................ 477/3 |
| 2006/0100056 A1 | * | 5/2006 | Yamauchi ........................ 477/3 |
| 2008/0234096 A1 | * | 9/2008 | Joshi et al. ........................ 477/3 |
| 2010/0004090 A1 | * | 1/2010 | Mizutani et al. .................. 477/7 |

FOREIGN PATENT DOCUMENTS

| | | |
|---|---|---|
| JP | A-2-133007 | 5/1990 |
| JP | A-5-76106 | 3/1993 |
| JP | A-5-328529 | 12/1993 |
| JP | A-6-189415 | 7/1994 |
| JP | A-6-219259 | 8/1994 |
| JP | A-7-15804 | 1/1995 |
| JP | A-7-67216 | 3/1995 |
| JP | A-8-237806 | 9/1996 |
| JP | A-11-208304 | 8/1999 |
| JP | 2000013922 A * | 1/2000 |
| JP | A-2000-32606 | 1/2000 |
| JP | A-2000-324621 | 11/2000 |
| JP | A-2001-186603 | 7/2001 |
| JP | 2005006406 A * | 1/2005 |
| JP | A-2005-143274 | 6/2005 |

* cited by examiner

FIG.6

| | VEHICULAR SPEED V1 | | | | | VEHICULAR BEHAVIORAL STABILITY LEVEL | |
|---|---|---|---|---|---|---|---|
| | MGR | MGL | MG2 | TOTAL TORQUE | EFFICIENCY [%] | IN TRAVELING STRAIGHT FORWARD | IN TURNING |
| A1 | 50 [%] | 50 [%] | 0 [%] | T1 | 88 | HIGH | LOW |
| A2 | 100 | 0 | 0 | T1 | 92 | LOW | HIGH |
| A3 | 40 | 40 | 20 | T1 | 86 | | |
| A4 | 80 | 0 | 20 | T1 | 85 | | |
| | | | | | | | |
| An | 0 | 0 | 100 | T1 | 80 | | |

FIG.7

| | VEHICULAR SPEED V4 | | | | | VEHICULAR BEHAVIORAL STABILITY LEVEL | | |
|---|---|---|---|---|---|---|---|---|
| | MGR | MGL | MG2 | TOTAL TORQUE | EFFICIENCY [%] | IN TRAVELING STRAIGHT FORWARD | IN TURNING | LOW μ ROAD |
| D1 | 0 [%] | 0 [%] | 100 [%] | T4 | 92 | LOW ↔ | HIGH ↔ | LOW ↔ |
| D2 | 10 | 0 | 90 | T4 | 85 | | | |
| D3 | 10 | 10 | 80 | T4 | 86 | | | |
| D4 | 20 | 0 | 80 | T4 | 87 | | | |
| Dm | 20 | 20 | 60 | T4 | 88 | HIGH | LOW | HIGH |

DRIVING POWER CONTROL APPARATUS FOR FOUR WHEEL DRIVE VEHICLE

TECHNICAL FIELD

The present invention relates generally to a driving power control apparatus for a four wheel drive vehicle, and particularly to a driving power control apparatus for a four wheel drive vehicle having right and left idler wheel units driven independently by individual driving sources.

BACKGROUND ART

In recent years, hybrid vehicles and electric vehicles are gaining attention as environmentally friendly vehicles. A hybrid vehicle has, as a source of motive power, a conventional engine and in addition thereto a motor driven by a direct current power supply via an inverter. More specifically, the engine is driven to obtain a source of motive power and the direct current power supply also provides direct current voltage which is in turn converted by the inverter to alternate current voltage employed to rotate the motor to obtain a source of motive power.

An electric vehicle is a vehicle having as a source of motive power a motor driven by a direct current power supply via an inverter.

For example, Japanese Patent Laying-Open No. 5-328529 discloses an electric vehicle having an electric motor device that is provided in a vehicular main body at a front side and generates a torque to rotate a rear drive wheel unit and configured of first and second motors exhibiting high efficiently in different operation ranges, respectively.

As described in the publication, the first and second motors have their respective rotors secured to a common, single output shaft and thus rotate around the same axis. The first and second motors generates torques, which are in turn output to the common output shaft and transmitted to a differential device via a propeller shaft coupled to the output shaft. The differential device transmits the received torques to the right and left drive wheel units, differentiating the rotations of the right and left drive wheel units.

The first motor is of a low rotation and large torque type, having a large outer diameter and a small axial dimension. The second motor is of a high rotation and small torque type, having a small outer diameter and a large axial dimension. When a required torque necessary for the electric vehicle to travel in accordance with its traveling condition(s) is calculated, an allocation of torques T1 and T2 output from the first and second motors for the required torque is determined.

Each motor's output torque allocation is determined in a method, as follows: An amount of energy supplied to the first and second motors from a power supply is calculated from the efficiency of the first motor outputting the allocated output torque T1 and that of the second motor outputting the allocated output torque T2, and output torques T1 and T2 are determined to minimize the calculated amount of energy. This allows the electric motor device's total efficiency to assume a maximum value. Furthermore, the torque required for traveling is generated by controlling driving the first and second motors, and a transmission is thus dispensed with.

Furthermore, Japanese Patent Laying-Open No. 2-133005 discloses a motored vehicle having a plurality of motors mounted therein as a driving power source. The motored vehicle determines a driving power control value for each motor to allow the motors to output driving powers, respectively, in total satisfying a driving power required for the vehicle and to also minimize the total sum of the amounts of energy provided to the motors, as based on a vehicular speed determining the mounted motors' efficiency, i.e., the motors' rotational speed, and the value of the driving power required for the vehicle.

As described therein, for example if the front wheel units and the rear wheel units are driven by separately provided two motors, and a decision is made that driving the wheel units by one motor maximizes the motors' total efficiency, then only one motor is driven. In contrast, if a decision is made that driving the wheel units by the two motors maximizes the motors' total efficiency, then the two motors are driven. In other words, a driving power required at the time is allocated between the plurality of motors to maximize the motors' total efficiency. This can increase a traveling distance per charge. Furthermore, the battery is not required to have large capacity, and the vehicle can be reduced in weight.

However, the electric vehicle disclosed in Japanese Patent Laying-Open No. 5-328529 has the first and second motors coupled to a common output shaft, and to enable the motors to exhibit high efficiency in different output ranges (or output torques and rotational speeds), respectively, providing the motors with different builds, respectively, is the only approach.

FIG. 14 shows a map in efficiency of the electric motor device described in Japanese Patent Laying-Open No. 5-328529. As can be seen from FIG. 14, the first and second motors have characteristics, respectively, as a motor, with different high efficiency ranges therein, respectively. However, such difference is uniquely determined by their difference in build, and the electric motor device as a whole has a limit to its output range that allows high efficiency. For example, in the FIG. 14 efficiency map, the first and second motors are both less efficient in a low output range, and it is considered difficult that the electric motor device as a whole maintains high efficiency until it reaches the low output range.

In the motored vehicle of Japanese Patent Laying-Open No. 2-133005, in contrast, while the two motors are coupled to separate drive wheel units, respectively, the motors are identical in build and thus have equivalent output characteristics, respectively. Thus their respective high efficiency operation ranges will generally match.

Accordingly in allocating an output torque between the two motors there is no other choice than causing the two motors to each equally output one half a required drive torque or causing one motor to output the entirety of the require drive torque. As such, an upper limit naturally arises to the motors' total efficiency that can be implemented.

The present invention has been made to solve such problem and contemplates a driving power control apparatus for a four wheel drive vehicle that can achieve high efficiency across a wide output range.

DISCLOSURE OF THE INVENTION

The present invention provides a driving power control apparatus for a four wheel drive vehicle having first left and right drive wheel units and second left and right drive wheel units. The driving power control apparatus for a four wheel drive vehicle includes: a first motor; a first power transmission mechanism transmitting a motive power generated by the first motor to the first left and right drive wheel units coupled to a first drive shaft; two second motors coupled to the second left and right drive wheel units, respectively, and drivable independently from each other, and having a rated output different from that of the first motor; a second power transmission mechanism transmitting motive powers generated by the two second motors to the second left and right drive wheel units, respectively; a first drive circuit receiving electric power from a power supply to control driving the first motor; two second drive circuits receiving electric power from the power supply to control driving the two second motors, respectively; a driving power allocation determination unit determining an allocation of an output between the first and second motors for a driving power that the first and second motors as a whole are required to output; and a driving control unit controlling the first and second drive circuits to cause the first and second motors to output their respective, allocated driving powers, respectively. At least one of the first and second power transmission mechanisms includes a speed reducer that transmits the motive power generated by an associated motor of the motors to an associated drive wheel unit of the drive wheel units such that the speed reducer reduces a rotational speed of the motive power. The driving power allocation determination unit includes: storage means for previously converting a characteristic in efficiency of each of the first and second motors with respect to its torque and its rotational speed into a characteristic in efficiency of each of the first and second motors with respect to its torque and vehicular speed, and storing the characteristic in efficiency thus converted; and first allocation determination means for determining the allocation of the output between the first and second motors, as based on a drive torque that the first and second motors as a whole are required to output and a vehicular speed, and on the characteristic in efficiency, as stored, of each of the first and second motors with respect to its torque and vehicular speed, to allow the first and second motors to output torques in total satisfying the drive torque that the first and second motors as a whole are required to output, and also to allow total efficiency of the first and second motors to be at least a predetermined threshold value.

The present driving power control apparatus for a four wheel drive vehicle has the first and second motors configured to have different rated outputs, respectively, and also be drivable at different rotational speeds, respectively, for a specific vehicular speed. Accordingly, in their respective characteristics in efficiency with respect to torque and vehicular speed, the motors exhibit high efficiency in different ranges, respectively. Accordingly, the motors' total efficiency can be held high across a high-to-low, wide output range by appropriately determining an allocation of a drive torque between the first and second motors so as to increase the motors' total efficiency in accordance with the motors' total, required drive torque and vehicular speed. As a result the four wheel drive vehicle can be improved in mileage.

Preferably, the driving power control apparatus for a four wheel drive vehicle further includes a driving power detection unit detecting a driving power that the first and second motors as a whole are required to output; and a vehicular speed detection unit detecting the vehicular speed. The first allocation determination means includes storage means for previously setting and storing therein an allocation of the output between the first and second motors that maximizes the total efficiency of the first and second motors, as based on the characteristic in efficiency of each of the first and second motors with respect to its torque and vehicular speed, for each combination of the drive torque that the first and second motors as a whole are required to output and the vehicular speed, and the first allocation determination means extracts from the storage means an allocation of the output between the first and second motors that corresponds to the drive torque, as detected, that the first and second motors as a whole are required to output, and to the vehicular speed as detected.

The present driving power control apparatus for a four wheel drive vehicle can allocate an output between the first and second motors in accordance with an allocation preset to maximize the motors' total efficiency, regardless of the magnitude of the driving power that the motors as a whole are required to output. The motors' total efficiency can thus be held high across a wide output range.

Preferably, the driving power control apparatus for a four wheel drive vehicle further includes a steering angle detection unit detecting a steering angle of the vehicle, and the first allocation determination means corrects, as based on the steering angle of the vehicle as detected, the allocation of the output between the first and second motors as determined.

The present driving power control apparatus for a four wheel drive vehicle allows the vehicle to establish both stability in traveling and satisfactory mileage performance.

Preferably, the driving power control apparatus for a four wheel drive vehicle further includes a wheel unit slip detection unit detecting that the first and second left and right drive wheel units slip, and when the wheel unit slip detection unit detects that either ones of the first and second left and right drive wheel units slip, the first allocation determination means corrects the allocation of the output between the first and second motors as determined.

The present driving power control apparatus for a four wheel drive vehicle allows the vehicle to establish both stability in traveling and satisfactory mileage performance.

Preferably, the driving power allocation determination unit further includes: means for obtaining an evaluation value indicating a level of stability in behavior of the vehicle for each combination of the drive torque that the first and second motors as a whole are required to output and the vehicular speed, as based on the allocation of the output between the first and second motors and on a condition that the vehicle assumes in traveling; second allocation determination means for selecting any allocation(s) of the output between the first and second motors, as based on the drive torque that the first and second motors as a whole are required to output and the vehicular speed and on the characteristic in efficiency, as converted, of each of the first and second motors with respect to its torque and vehicular speed, such that a total sum of the torques output from the first and second motors satisfies the drive torque that the first and second motors as a whole are required to output and the total efficiency of the first and second motors also exceeds the predetermined threshold value, and for determining as the allocation of the output between the first and second motors an allocation of any allocation(s) selected that maximizes the evaluation value in accordance with the condition that the vehicle assumes in traveling; and select means externally operable for selecting one of the first and second allocation determination means in accordance with how the select means is operated.

The present driving power control apparatus for a four wheel drive vehicle can both ensure the vehicle of dynamics and achieve improved mileage.

Preferably, the driving power control apparatus for a four wheel drive vehicle further includes: a voltage conversion circuit converting voltage between the power supply and the first drive circuit; a first switch circuit closed to be capable of supplying the second drive circuits with a voltage from the power supply directly; and a second switch circuit closed to be capable of supplying the second drive circuits with a voltage output from the voltage conversion circuit. The driving power allocation determination unit further includes: calculation means for calculating a target value for the voltage input to the second drive circuits, as based on the driving power allocated to the second motors; first opening/closing control means operative in response to the target value, as calculated, being at most the voltage received from the power supply, for closing the first switch circuit and also opening the second switch circuit; and second opening/closing control means operative in response to the target value, as calculated, being higher than the voltage received from the power supply, for opening the first switch circuit and also closing the second switch circuit.

The present driving power control apparatus for a four wheel drive vehicle can reduce an electric power loss caused in a voltage converter, while ensuring a driving power received from the second motor. As a result the motors' total efficiency can further be enhanced.

Preferably, the first left and right drive wheel units configure front wheel units of the vehicle and the second left and right drive wheel units configure rear wheel units of the vehicle.

For the present driving power control apparatus for a four wheel drive vehicle, rear wheel units serving as idler wheel units are configured to have only one of the right and left rear wheel units drivable. This allows only one of the rear wheel units to be driven, depending on a condition that the vehicle assumes in traveling, to allow the vehicle to travel with one wheel unit driven to efficiently drive the second motor serving as a driving power source. As a result the motors' total efficiency can be enhanced.

Preferably, the first left and right drive wheel units configure rear wheel units of the vehicle and the second left and right drive wheel units configure front wheel units of the vehicle.

The present driving power control apparatus for a four wheel drive vehicle imposes a lighter limitation in a vehicle having rear wheel units as main drive wheel units and front wheel units as idler wheel units on an allocation of a driving power to the front wheel units in accordance with the vehicle's dynamics than in a vehicle having front wheel units as main drive wheel units and rear wheel units as idler wheel units. This can provide an increased degree of freedom in allocating a driving power. The motors' total efficiency can further be enhanced.

Preferably, the two second motors are each an in-wheel motor.

The present driving power control apparatus for a four wheel drive vehicle that has the second motors implemented as in-wheel motors incorporated in the second right and left drive wheel units, respectively, can occupy a reduced space.

Preferably, the vehicle is a hybrid vehicle. The first power transmission mechanism provides a composition of a motive power generated by an internal combustion engine and the motive power generated by the first motor and transmits the composition to the first left and right drive wheel units coupled to the first drive shaft. The driving power allocation determination unit determines an allocation of an output between the internal combustion engine and all of the first and second motors for a driving power that the vehicle is required to output, and the driving power allocation determination unit also determines an allocation of the output between the first and second motors for a driving power, as determined, that the first and second motors as a whole are required to output.

The present driving power control apparatus for a four wheel drive vehicle also allows a hybrid vehicle to have its motors as a whole driven efficiently and can thus achieve further improved mileage.

In accordance with the present invention a four wheel drive vehicle having as a motive power source a plurality of motors configured to have different rated outputs and be drivable at different rotational speeds for a specific vehicular speed can hold the motors' total efficiency high across a high to low, wide output range. As a result the four wheel drive vehicle can achieve improved mileage.

BRIEF DESCRIPTION OF THE DRAWINGS

FIG. 6 shows a relationship between how a drive torque is allocated between motor generators MG2, MGR, MGL and the motor generators' total efficiency.

FIG. 7 shows a relationship between how a drive torque is allocated between motor generators MG2, MGR, MGL and the motor generators' total efficiency.

BEST MODES FOR CARRYING OUT THE INVENTION

Hereinafter reference will be made to the drawings to describe the present invention in embodiments. In the figures, identical or corresponding components are identically denoted and will not be described repeatedly in detail.

Figure 1:
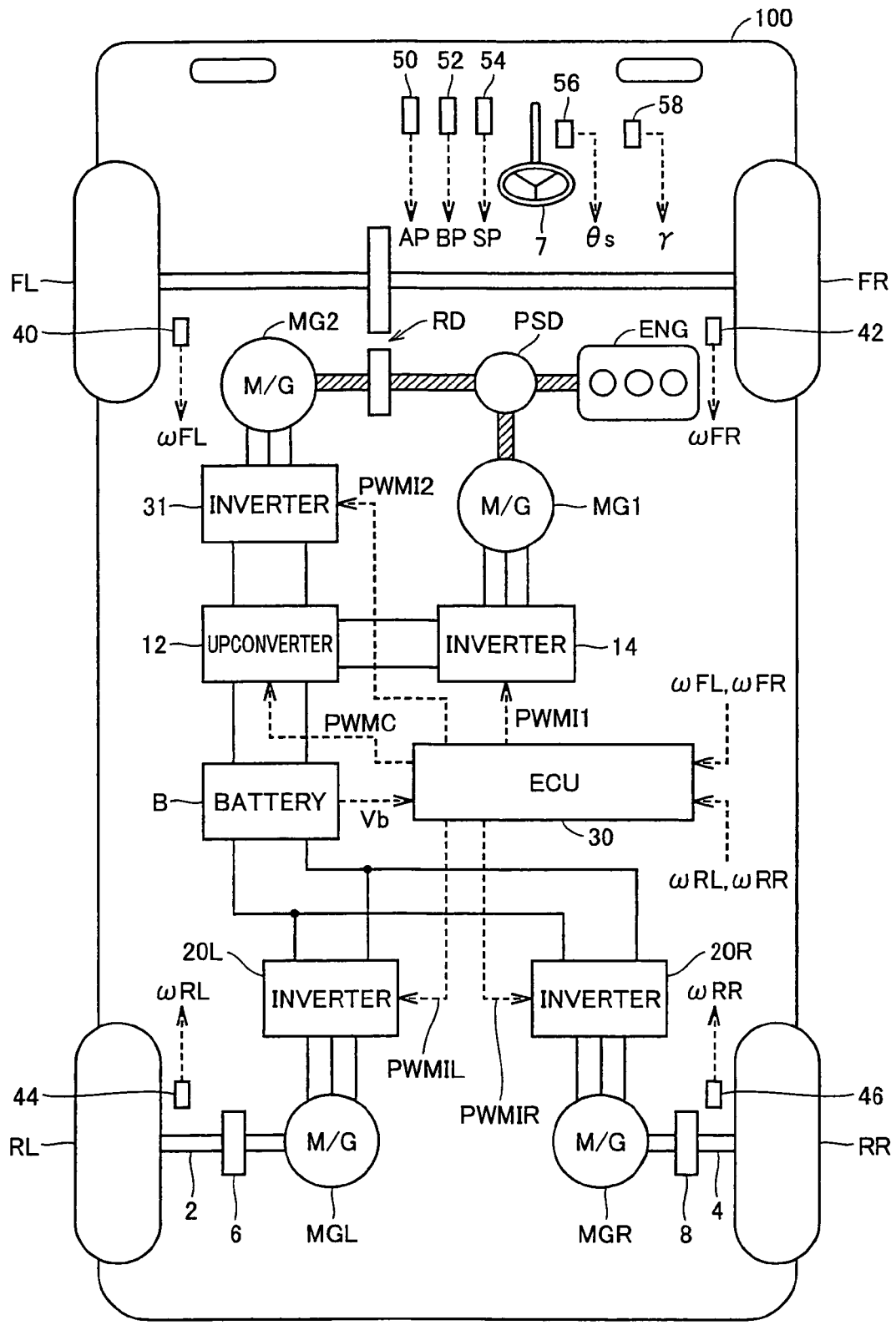
FIG. 1 is a schematic block diagram of a drive system of a vehicle having mounted therein a driving power control apparatus for a four wheel drive vehicle in an embodiment of the present invention.

FIG. 1 is a schematic block diagram showing a drive system of a vehicle having mounted therein a driving power control apparatus for a four wheel drive vehicle in an embodiment of the present invention.

With reference to FIG. 1, a vehicle 100 is an FF based hybrid four wheel drive vehicle for example having front left and right wheel units FL, FR as main drive wheel units and rear left and right wheel units RL, RR as idler wheel units. The hybrid four wheel drive vehicle adopts a system driving two wheels independently that drives front left and right wheel units FL, FR by an engine ENG and a motor generator MG2 and drives rear left and right wheel units RL, RR by motor generators MGL, MGR independently.

Note that other than the FIG. 1 configuration, the hybrid four wheel drive vehicle may have an FR based configuration driving front left and right wheel units FL, FR as idler wheel units by motor generators MGL, MGR independently and driving rear left and right wheel units RL, RR as main drive wheel units by engine ENG and a rear motor generator.

Vehicle 100 includes motor generators MGL, MGR, speed reducers 6, 8, inverters 20L, 20R, an electronic control unit (ECU) 30, and a battery B as a device driving rear left and right wheel units RL, RR.

Motor generators MGL, MGR are coupled with shafts 2, 4 driving rear left and right wheel units RL, RR, respectively, and respectively drive them independently. As motor generators MGL, MGR, in-wheel motors incorporated inside their respective wheel units' wheels are adopted.

Motor generators MGR, MGL are for example 3-phase alternate current motors and driven by electric power stored in battery B. Motor generator MGR's driving power is transmitted via speed reducer 8 to shaft 4 driving rear right wheel unit RR. Motor generator MGL's driving power is transmitted via speed reducer 6 to shaft 2 driving rear left wheel unit RL.

Furthermore when vehicle 100 is regeneratively braked, motor generators MGL, MGR are rotated via speed reducers, 6, 8 by rear left and right wheel units RL, RR, respectively, to operate as power generators to regenerate electric power which in turn charges battery B via inverters 20L, 20R.

Herein, speed reducers 6, 8 provided for rear left and right wheel units RL, RR, and a speed reducer RD provided for front left and right wheel units FL, FR, as will be described later, have their respective reduction ratios set individually to satisfy output characteristics that their respectively associated motor generators are required to provide. Thus motor generator MG2 and motor generators MGR, MGL can be driven at different rotational speeds, respectively, for a specific vehicular speed. Speed reducers 6, 8, RD may not all be provided. Only speed reducers 6, 8 may be provided or only speed reducer RD may be provided.

Battery B is a nickel metal hydride battery, a lithium ion battery or a similar secondary battery, fuel cell or the like. Furthermore, battery B may be replaced with an electric power storage device implemented by an electric double layer capacitor or a similar capacitor of large capacitance.

Inverters 20L, 20R control driving motor generators MGL, MGR, respectively. Inverter 20L is formed of a U phase arm, a V phase arm and a W phase arm, although not shown. Each phase arm is formed of two power devices connected in series between a power supply line and an earth line. Each phase arm has an intermediate point connected to an end of a phase coil of motor generator MGL through a power line. In other words, motor generator MGL has three U, V, W phase coils with their respective one ends connected commonly to a neutral point. The U phase coil has another end connected to an intermediate point of the U phase arm. The V phase coil has another end connected to an intermediate point of the V phase arm. The W phase coil has another end connected to an intermediate point of the W phase arm.

Inverter 20R has a configuration similar to that of inverter 20L, and has each phase arm having an intermediate point connected to an end of a phase coil of motor generator MGR through a power line.

When inverters 20L, 20R receive direct current voltage from battery B, inverters 20L, 20R operate in response to signals PWMIL, PWMIR received from ECU 30 to convert the direct current voltage to alternate current voltage to drive motor generators MGL, MGR, respectively. Motor generators MGL, MGR are thus driven to generate torque in accordance with a required drive torque.

Furthermore, when vehicle 100 is regeneratively braked, inverters 20L, 20R convert alternate current voltage that is generated by motor generators MGL, MGR into direct current voltage in response to signals PWMIL, PWMIR issued from ECU 30, and inverters 20L, 20R supply the direct current voltage to battery B. Note that regenerative braking as referred to herein includes: braking accompanied by power regeneration when a driver of vehicle 100 operates the foot brake; not operating the foot brake, while releasing the accelerator pedal while the vehicle is traveling, to reduce vehicular speed (or stop acceleration) while providing power regeneration; and the like.

Vehicle 100 further includes engine ENG, motor generators MG1, MG2, a power split device PSD, speed reducer RD, inverters 14, 31 controlling driving motor generators MG1, MG2, and an upconverter 12 as a device driving front left and right wheel units FL, FR.

Engine ENG uses gasoline or similar fuel's combustion energy as a source to generate driving power, which is in turn divided by power split device PSD to a path for transmission to motor generator MG1 generating direct current electric power and that for transmission via speed reducer RD to a shaft driving front left and right wheel units FL, FR.

Motor generator MG1 is rotated by the driving power transmitted from engine ENG via power split device PSD and thus generates electric power which is in turn supplied through an electric power line to inverter 14 and used as electric power charging battery B or that driving motor generator MG2.

Motor generator MG2 is driven to rotate by alternate current electric power supplied from inverter 31 through an electric power line. Motor generator MG2 generates driving power which is in turn transmitted via speed reducer RD to the shaft driving front left and right wheel units FL, FR.

Furthermore in a regenerative braking operation if motor generator MG2 is rotated as wheel units FL, FR decelerate, the electromotive force generated in motor generator MG2 is supplied to an electric power line. In that case, inverter 31 converts the electric power supplied on the electric power line into direct current electric power which in turn charges battery B via upconverter 12.

Vehicle 100 also includes an accelerator pedal position sensor 50 detecting an accelerator pedal position AP, a brake pedal position sensor 52 detecting a brake pedal position BP, a shift position sensor 54 detecting a shift position SP, a handle 7, a steering angle sensor 56 detecting a steering angle $\theta s$ of handle 7, and a yaw rate sensor 58 detecting a yaw rate $\gamma$. Vehicle 100 also includes wheel unit speed sensors 40, 42, 44, 46 detecting rotational speeds $\omega FL$, $\omega FR$, $\omega RL$, $\omega RR$ of wheel units FL, FR, RL, RR. These sensors' detection signals are input to ECU 30.

ECU 30 is electrically connected to engine ENG, inverters 20L, 20R, 14, 31 and battery B and integrally controls how engine ENG should be operated, how motor generators MGR, MGL and motor generators MG1, MG2 should be driven, and how battery B should be charged.

Figure 2:
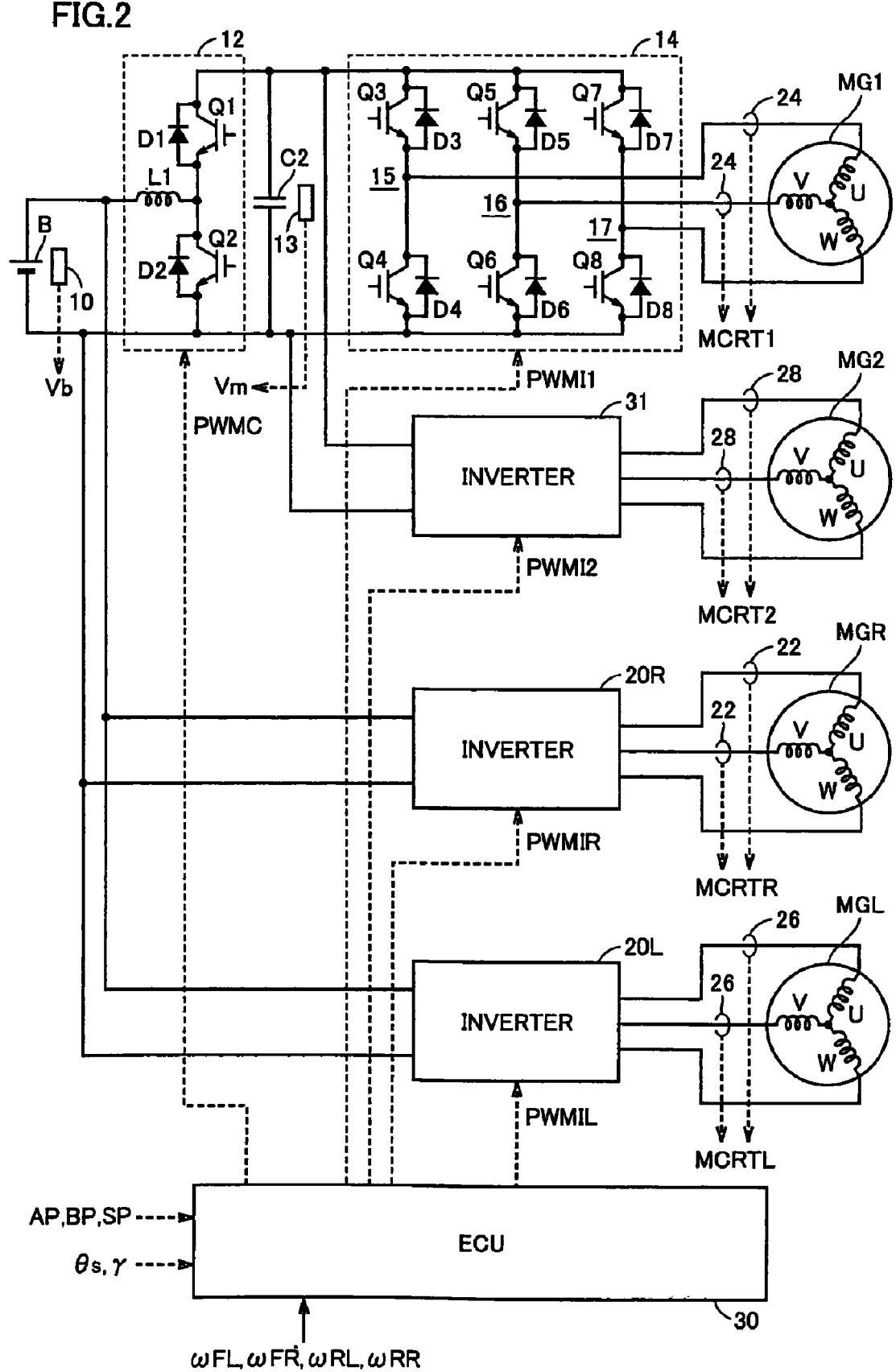
FIG. 2 is a schematic block diagram of a drive device of the vehicle of FIG. 1

FIG. 2 is a schematic block diagram of a drive device of vehicle 100 of FIG. 1.

With reference to FIG. 2, the drive device includes battery B, upconverter 12, inverters 14, 31, 20R, 20L, voltage sensors 10, 13, current sensors 22, 24, 26, 28, and ECU 30.

Motor generators MGR, MGL are 3-phase alternate current motors in the form of an in-wheel motor and driven by electric power stored in battery B. Motor generator MGR's driving power is transmitted via a speed reducer to the shaft (not shown) driving rear right wheel unit RR (not shown). Motor generator MGL's driving power is transmitted via a speed reducer to the shaft (not shown) driving rear left wheel unit RL (not shown).

Although motor generators MG1, MG2 can function as either power generators or motors, motor generator MG1 operates mainly as a power generator and motor generator MG2 operates mainly as a motor.

More specifically, motor generator MG1 is a 3-phase alternate current motor and in acceleration it is used as a starter starting engine ENG. In doing so, motor generator MG1 receives electric power from battery B and is thus driven as a motor, and cranks and thus starts engine ENG.

Furthermore after engine ENG is started, motor generator MG1 is rotated by the driving power transmitted from engine ENG via power split device PSD and thus generates electric power.

The electric power generated by motor generator MG1 is used differently depending on how the vehicle is driven, how much amount is charged in battery B, and the like. For example in normally traveling or acceleration the electric power generated by motor generator MG1 exactly serves as electric power driving motor generator MG2. In contrast, if battery B is charged with an amount smaller than a predetermined value, then the electric power generated by motor generator MG1 is converted by inverter 14 from alternate current electric power to direct current electric power and thus stored in battery B.

Motor generator MG2 is a 3-phase alternate current motor and driven by at least one of electric power stored in battery B and that generated by motor generator MG1. Motor generator MG2's driving power has its rotational speed reduced via speed reducer RD at a predetermined speed reduction ratio and thus transmitted to the shaft driving front left and right wheel units FL, FR. Thus motor generator MG2 assists engine ENG to cause vehicle 100 to travel, or causes vehicle 100 to travel by only the driving power of the motor generator.

Furthermore when vehicle 100 is regeneratively braked, motor generator MG2 is rotated by front left and right wheel units FL, FR, via speed reducer RD to operate as a power generator to regenerate electric power which in turn charges battery B via inverter 31.

Upconverter 12 is provided between battery B and inverters 14, 31 and includes a reactor L1, IGBT devices Q1, Q2, and diodes D1, D2. Reactor L1 has one end connected to a power supply line of battery B, and the other end connected to a point intermediate between IGBT device Q1 and IGBT device Q2, i.e., between the emitter of IGBT device Q1 and the collector of IGBT device Q2. IGBT devices Q1, Q2 are connected between a power supply line and an earth line in series. IGBT device Q1 has its collector connected to the power supply line and IGBT device Q2 has its emitter connected to the earth line. Furthermore, diode D1 is provided between the collector and emitter of IGBT device Q1 to pass a current from the emitter to the collector, and diode D2 is provided between the collector and emitter of IGBT device Q2 to pass a current from the emitter to the collector.

Inverter 14 is formed of a U phase arm 15, a V phase arm 16, and a W phase arm 17. U phase arm 15, V phase arm 16 and W phase arm 17 are provided between a power supply line and an earth line in parallel.

U phase arm 15 is formed of series connected IGBT devices Q3, Q4. V phase arm 16 is formed of series connected IGBT devices Q5, Q6. W phase arm 17 is formed of series connected IGBT devices Q7, Q8. Furthermore, a diode D3 is connected between the collector and emitter of IGBT device Q3 to pass a current from the emitter to the collector. A diode D4 is connected between the collector and emitter of IGBT device Q4 to pass a current from the emitter to the collector. A diode D5 is connected between the collector and emitter of IGBT device Q5 to pass a current from the emitter to the collector. A diode D6 is connected between the collector and emitter of IGBT device Q6 to pass a current from the emitter to the collector. A diode D7 is connected between the collector and emitter of IGBT device Q7 to pass a current from the emitter to the collector. A diode D8 is connected between the collector and emitter of IGBT device Q8 to pass a current from the emitter to the collector.

Each phase arm has an intermediate point connected to an end of a phase coil of motor generator MG1. In other words, motor generator MG1 has three U, V, W phase coils with their respective one ends connected commonly to a neutral point. The U phase coil has another end connected to a point intermediate between IGBT devices Q3, Q4. The V phase coil has another end connected to a point intermediate between IGBT devices Q5, Q6. The W phase coil has another end connected to a point intermediate between IGBT devices Q7, Q8.

Inverter 31 has a configuration similar to that of inverter 14.

Upconverter 12 receives direct current voltage Vb from battery B, upconverts the received direct current voltage, and supplies the upconverted direct current voltage to capacitor C2. More specifically, when upconverter 12 receives a signal PWMC from ECU 30, upconverter 12 upconverts direct current voltage Vb in accordance with a period for which IGBT device Q2 is turned on by signal PWMC, and upconverter 12 supplies the upconverted direct current voltage Vb to capacitor C2.

Furthermore, when upconverter 12 receives signal PWMC from ECU 30, upconverter 12 downconverts direct current voltage supplied from inverter 14 and/or inverter 31 via capacitor C2, and supplies the downconverted direct current voltage to charge battery B.

Capacitor C2 receives direct current voltage from upconverter 12, smoothes the received direct current voltage, and supplies the smoothed direct current voltage to inverters 14, 31. Voltage sensor 13 detects a voltage across capacitor C2, i.e., a voltage Vm output from upconverter 12, which corresponds to a voltage input to inverters 14, 31, and this will also be maintained hereinafter, and voltage sensor 13 outputs the detected voltage Vm to ECU 30.

When inverter 14 receives direct current voltage from battery B via capacitor C2, inverter 14 operates in response to a signal PWMI1 received from ECU 30 to convert the direct current voltage to alternate current voltage to drive motor generator MG1. Motor generator MG1 is thus driven to generate torque in accordance a torque control value TR1.

Furthermore, when vehicle 100 having the drive device mounted therein is regeneratively braked, inverter 14 converts alternate current voltage that is generated by motor generator MG1 into direct current voltage in response to signal PWMI1 issued from ECU 30, and inverter 14 supplies the direct current voltage via capacitor C2 to upconverter 12. Note that regenerative braking as referred to herein includes: braking accompanied by power regeneration when a driver of vehicle 100 operates the foot brake; not operating the foot brake, while releasing the accelerator pedal while the vehicle is traveling, to reduce vehicular speed (or stop acceleration) while providing power regeneration; and the like.

When inverter 31 receives direct current voltage from battery B via capacitor C2, inverter 31 operates in response to a signal PWMI2 received from ECU 30 to convert the direct current voltage to alternate current voltage to drive motor generator MG2. Motor generator MG2 is thus driven to generate torque in accordance a torque control value TR2.

Furthermore, when vehicle 100 is regeneratively braked, inverter 31 converts alternate current voltage that is generated by motor generator MG2 into direct current voltage in response to signal PWMI2 issued from ECU 30, and inverter 31 supplies the direct current voltage via capacitor C2 to upconverter 12.

Current sensor 24 detects a motor current MCRT1 flowing to motor generator MG1 and outputs the detected motor current MCRT1 to ECU 30. Current sensor 28 detects a motor current MCRT2 flowing to motor generator MG2 and outputs the detected motor current MCRT2 to ECU 30.

Inverters 20R, 20L have a configuration similar to that of inverters 14, 31 as described above, except that inverters 14, 31 are connected to battery B via upconverter 12, whereas inverters 20R, 20L are connected to battery B directly.

More specifically, when inverter 20R receives direct current voltage directly from battery B, inverter 14 operates in response to signal PWMIR received from ECU 30 to convert the direct current voltage to alternate current voltage to drive motor generator MGR. Motor generator MGR is thus driven to generate torque in accordance a torque control value TRR.

Furthermore, when vehicle 100 is regeneratively braked, inverter 20R converts alternate current voltage that is generated by motor generator MGR into direct current voltage in response to signal PWMIL issued from ECU 30, and inverter 20R supplies the direct current voltage directly to battery B.

Similarly, when inverter 20L receives direct current voltage directly from battery B, inverter 20L operates in response to signal PWMIL received from ECU 30 to convert the direct current voltage to alternate current voltage to drive motor generator MGL. Motor generator MGL is thus driven to generate torque in accordance a torque control value TRL.

Furthermore, when vehicle 100 is regeneratively braked, inverter 20L converts alternate current voltage that is generated by motor generator MGL into direct current voltage in response to signal PWMIL issued from ECU 30, and inverter 20L supplies the direct current voltage directly to battery B.

Current sensor 22 detects a motor current MCRTR flowing to motor generator MGR and outputs the detected motor current MCRTR to ECU 30. Current sensor 26 detects a motor current MCRTL flowing to motor generator MGL and outputs the detected motor current MCRTL to ECU 30.

Figure 3:
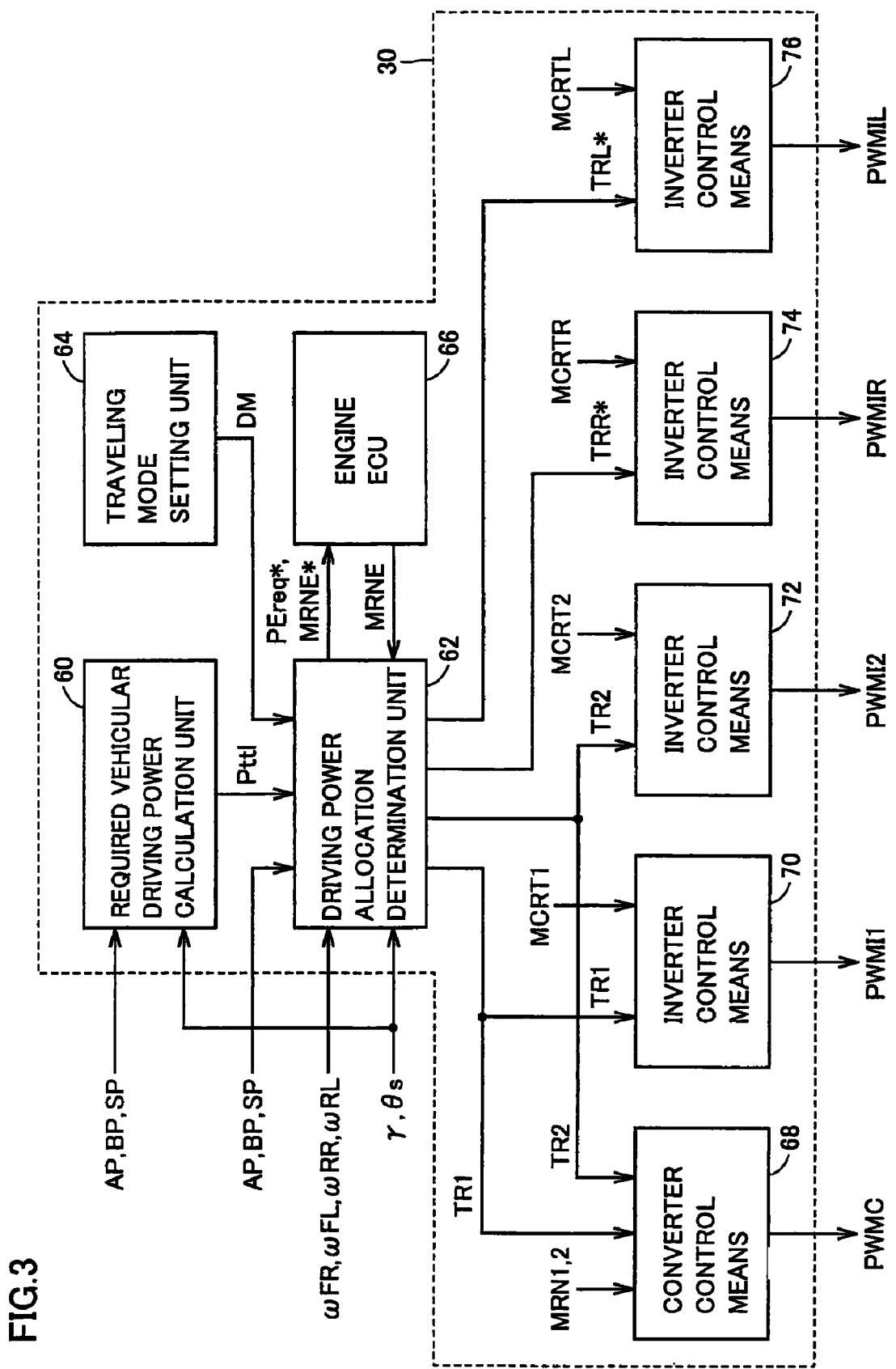
FIG. 3 is a block diagram of a function of an ECU of FIG. 2.

FIG. 3 is a block diagram of a function of ECU 30 shown in FIG. 2.

With reference to FIG. 3, ECU 30 includes a required vehicular driving power calculation unit 60, a driving power allocation determination unit 62, a traveling mode setting unit 64, an engine ECU 66, converter control means 68, and inverter control means 70, 72, 74, 76.

ECU 20 receives accelerator pedal position AP from accelerator pedal position sensor 50 (not shown), brake pedal position BP from brake pedal position sensor 52 (not shown), shift position SP from shift position sensor 54 (not shown), steering angle θs of handle 7 from steering angle sensor 56 (not shown), a yaw rate γ from yaw rate sensor 58 (not shown), and rotational speeds ωFL, ωFR, ωRL, ωRR of wheel units FL, FR, RL, RR from wheel unit speed sensors 40, 42, 44, 46 (not shown). Furthermore, ECU 30 receives direct current voltage Vb from voltage sensor 10, voltage Vm output from upconverter 12 (i.e., the voltage input to inverter 14) from voltage sensor 13, and motor currents MCRT1, MCRT2, MCRTR, MCRTL from current sensors 24, 28, 22, 26, respectively.

Required vehicular driving power calculation unit 60 calculates a driving power Pttl that vehicle 100 as a whole is required to output (hereinafter also referred to as "required vehicular driving power") based on accelerator pedal position AP, brake pedal position BP, shift position SP, yaw rate γ and vehicular speed V. Vehicular speed V is for example an average value of rotational speeds ωFL, ωFR, ωRL, ωRR of wheel units FL, FR, RL, RR.

Driving power allocation determination unit 62 receives the calculated required vehicular driving power Pttl from required driving power calculation unit 60, and a traveling mode DM, which is designated by the driver of vehicle 100, from traveling mode setting unit 64. Furthermore driving power allocation determination unit 62 receives accelerator pedal position AP from accelerator pedal position sensor 50, brake pedal position BP from brake pedal position sensor 52, shift position SP from shift position sensor 54, steering angle θs of handle 7 from steering angle sensor 56, and yaw rate γ from yaw rate sensor 58. Furthermore, driving power allocation determination unit 62 receives rotational speeds ωFL, ωFR, ωRL, ωRR of wheel units FL, FR, RL, RR from wheel unit speed sensors 40, 42, 44, 46, and engine speed MRNE from engine ECU 66.

Driving power allocation determination unit 62 determines for required vehicular driving power Pttl an allocation of a driving power between engine ENG and motor generators MG2, MGR, MGL in accordance with how vehicle 100 is driven. More specifically, driving power allocation determination unit 62 considers engine ENG's efficiency in terms of mileage and thus determines the allocation of the driving power in accordance with how vehicle 100 is driven. In other words, driving power allocation determination unit 62 determines engine ENG's required driving power PEreq* and motor generators MG2, MGR, MGL's total required driving power PMreq*.

Then, driving power allocation determination unit 62 calculates a torque control value TE* and target engine speed MRNE* for engine ENG from the engine's required driving power PEreq* as determined and outputs them to engine ECU 66. Thus engine ECU 66 controls the motive power (engine speed multiplied by torque) output from engine ENG to match target engine speed MRNE* and actual engine speed MRNE.

Furthermore, driving power allocation determination unit 62 determines for the motors' required driving power PMreq* as determined an allocation of a driving power between motor generators MG2, MGR, MGL. More specifically, driving power allocation determination unit 62 determines the allocation of the driving power between motor generators MG2, MGR, MGL, as based on the motors' required drive torque TM* and vehicular speed V corresponding to the motors' required driving power PMreq*, and on the characteristic in efficiency of each of motor generators MG2, MGR, MGL with respect to its torque and vehicular speed V. More specifically, driving power allocation determination unit 62 determines motor generator MG2's required drive torque TR2, motor generator MGR's required drive torque TRR*, and motor generator MGL's required drive torque TRL*.

Note that when driving power allocation determination unit 62 determines how a drive torque should be allocated, it adopts different methods depending on traveling mode DM received from traveling mode setting unit 64, as will be described hereinafter.

Driving power allocation determination unit 62 sets motor generator MG2's required drive torque TR2 as torque control value TR2 and outputs it to inverter control means 72 and converter control means 68 to output a torque corresponding to required drive torque TR2.

Note that when a portion of the driving power output from engine ENG is used as electric power used by motor generator MG1 to generate power, the electric power generated by motor generator MG1 is utilized to drive motor generator MG2. In that case, driving power allocation determination unit 62 further sets motor generator MG1's required drive torque TR1 as torque control value TR1 and outputs it to inverter control means 70 and converter control means 68.

Furthermore, driving power allocation determination unit 62 outputs the determined motor generator MGR's required drive torque TRR* and motor generator MGL's required drive torque TRL* to inverter control means 74 and 76, respectively.

Figure 4:
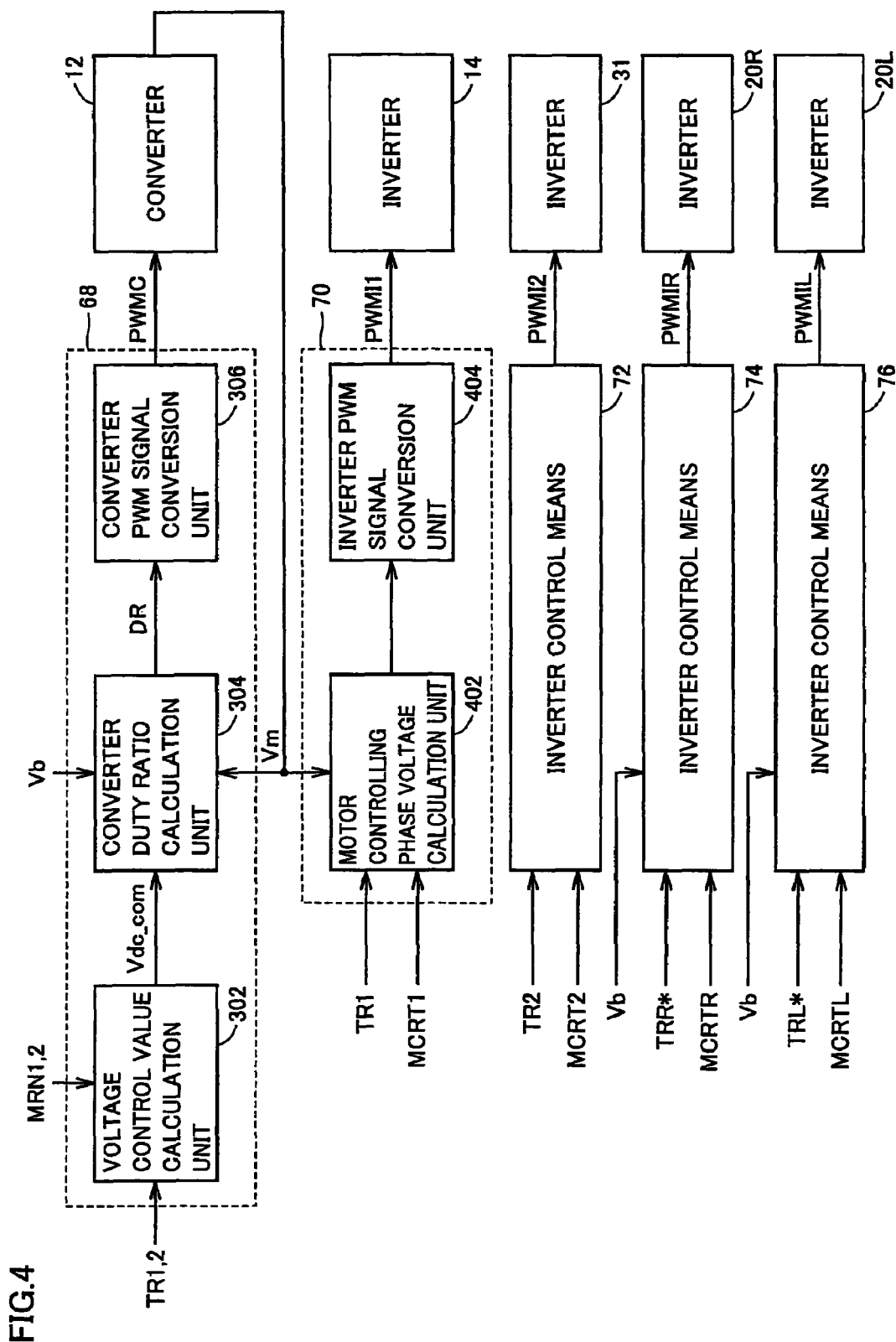
FIG. 4 is a block diagram of a function of converter control means and inverter control means shown in FIG. 3.

FIG. 4 is a block diagram of a function of converter control means 68 and inverter control means 70, 72, 74, 76 shown in FIG. 3.

With reference to FIG. 4, converter control means 68 includes a voltage control value calculation unit 302, a converter duty ratio calculation unit 304, and a converter PWM signal conversion unit 306.

Voltage control value calculation unit 302 calculates an optimum value for voltage input to inverters 14, 31, i.e., a voltage control value Vdc_com of upconverter 12, from torque control values TR1, TR2 received from driving power allocation determination unit 62 and motor speeds MRN1, MRN2 received from a speed sensor (not shown), and outputs the calculated voltage control value Vdc_com to converter duty ratio calculation unit 304.

Converter duty ratio calculation unit 304 receives direct current voltage Vb from voltage sensor 10, output voltage Vm from voltage sensor 13, and voltage control value Vdc_com from voltage control value calculation unit 302. Converter duty ratio calculation unit 304 calculates a duty ratio DR for setting output voltage Vm as voltage control value Vdc_com and outputs the calculated duty ratio DR to converter PWM signal conversion unit 306.

Converter PWM signal conversion unit 306 generates signal PWMC based on duty ratio DR received from converter duty ratio calculation unit 304 for turning on/off IGBT devices Q1, Q2 of upconverter 12, and outputs the generated signal PWMC to upconverter 12.

Inverter control means 70 includes a motor controlling phase voltage calculation unit 402 and an inverter PWM signal conversion unit 404.

Motor controlling phase voltage calculation unit 402 calculates a voltage applied to each phase coil of motor generator MG1, as based on torque control value TR1 received from driving power allocation determination unit 62, motor current MCRT1 received from current sensor 24, and output voltage Vm received from voltage sensor 13, and outputs the calculated voltage to inverter PWM signal conversion unit 404.

Inverter PWM signal conversion unit 404 generates signal PWMI1 based on the calculation received from motor controlling phase voltage calculation unit 402 for actually turning on/off IGBT devices Q3-Q8 of inverter 14, and outputs the generated signal PWMI1 to each of IGBT devices Q3-Q8 of inverter 14.

Inverter control means 72, 74, 76 are identical in configuration to inverter control means 70. It should be noted, however, that as inverter 20R is connected to battery B without upconverter 12 therebetween, inverter control means 74 has motor controlling phase voltage calculation unit 402 calculating a voltage applied to each phase coil of motor generator MGR, as based on required drive torque TRR* received from driving power allocation determination unit 62, motor current MCRTR received from current sensor 22, and direct current voltage Vb received from voltage sensor 10, and outputting the calculation result to inverter PWM signal conversion unit 404.

Similarly, as inverter 20L is connected to battery B without upconverter 12 therebetween, inverter control means 76 has motor controlling phase voltage calculation unit 402 calculating a voltage applied to each phase coil of motor generator MGL, as based on required drive torque TRL* received from driving power allocation determination unit 62, motor current MCRTL received from current sensor 26, and direct current voltage Vb received from voltage sensor 10, and outputting the calculation result to inverter PWM signal conversion unit 404.

Thus inverters 14, 31, 20R, 20L have IGBT devices Q3-Q8 controlled to switch to control a current passed to each phase coil of the associated motor generators to allow motor generators MG1, MG2, MGR, MGL to output torques, respectively, as designated. Thus a motor driving current is controlled and a motor torque is output that corresponds to torque control values TR1, TR2 and required drive torques TRR*, TRL*.

[Method of Determining How Drive Torque Should Be Allocated Between Motor Generators MG2, MGR, MGL]

Reference will now be made again to FIG. 3 to describe a method performed in the driving power control apparatus for a four wheel drive vehicle in accordance with the present invention in an embodiment to determine how a drive torque should be allocated between motor generators MG2, MGR, MGL.

More specifically, driving power allocation determination unit 62 determines for the motors' required driving power PMreq* how a drive torque should be allocated between motor generators MG2, MGR, MGL by a method varying with traveling mode DM received from traveling mode setting unit 64.

For traveling mode DM, a mileage oriented mode and a dynamics oriented mode are for example preset. The mileage oriented mode is a traveling mode maximizing the motor generators' total efficiency to give priority to mileage. The dynamics oriented mode is a traveling mode maintaining the motor generators' total efficiency at least a predetermined value while giving priority to the dynamics of vehicle 100. The driver of vehicle 100 can operate a switch or the like provided in the cabin in a vicinity of the driver's seat to select one of the two traveling modes at any time depending on a condition that vehicle 100 assumes in traveling.

If the mileage oriented mode is selected as traveling mode DM, driving power allocation determination unit 62 determines how a required drive torque should be allocated between motor generators MG2, MGR, MGL, as based on motor generators MG2, MGR, MGL's total required drive torque TM* and vehicular speed V, to maximize the motor generators' total efficiency.

Note that the motor generators' total efficiency means the ratio of the total sum of the driving powers generated by motor generators MG2, MGR, MGL, respectively, (i.e., a drive torque multiplied by the number of revolutions) relative to the total sum of the amounts of electric power supplied to motor generators MG2, MGR, MGL, respectively. In other words, maximizing the motor generators' total efficiency corresponds to minimizing the total sum of the amounts of electric power supplied to the motor generators, respectively, when the total sum of the driving powers respectively of the motor generators satisfies the motors' required driving power PMreq*.

In contrast, if the dynamics oriented mode is selected as traveling mode DM, driving power allocation determination unit 62 determines how a required drive torque should be allocated between motor generators MG2, MGR, MGL to allow the motor generators' total efficiency to exceed a predetermined threshold value, and also to best stabilize vehicle 100 in behavior. Note that the dynamics of vehicle 100 includes: traveling stability in traveling straight forward, cornering, and the like; road ability in traveling on a road of a low coefficient of friction (a low μ road); and the like.

Hereinafter will be described in detail a method of determining how a required drive torque is allocated between motor generators MG2, MGR, MGL in each traveling mode.

[1] Method of Determining How a Required Drive Torque Should Be Allocated in Mileage Oriented Mode Initially will be described a method of determining how a drive torque is allocated when the mileage oriented mode is selected as traveling mode DM.

Figure 5:
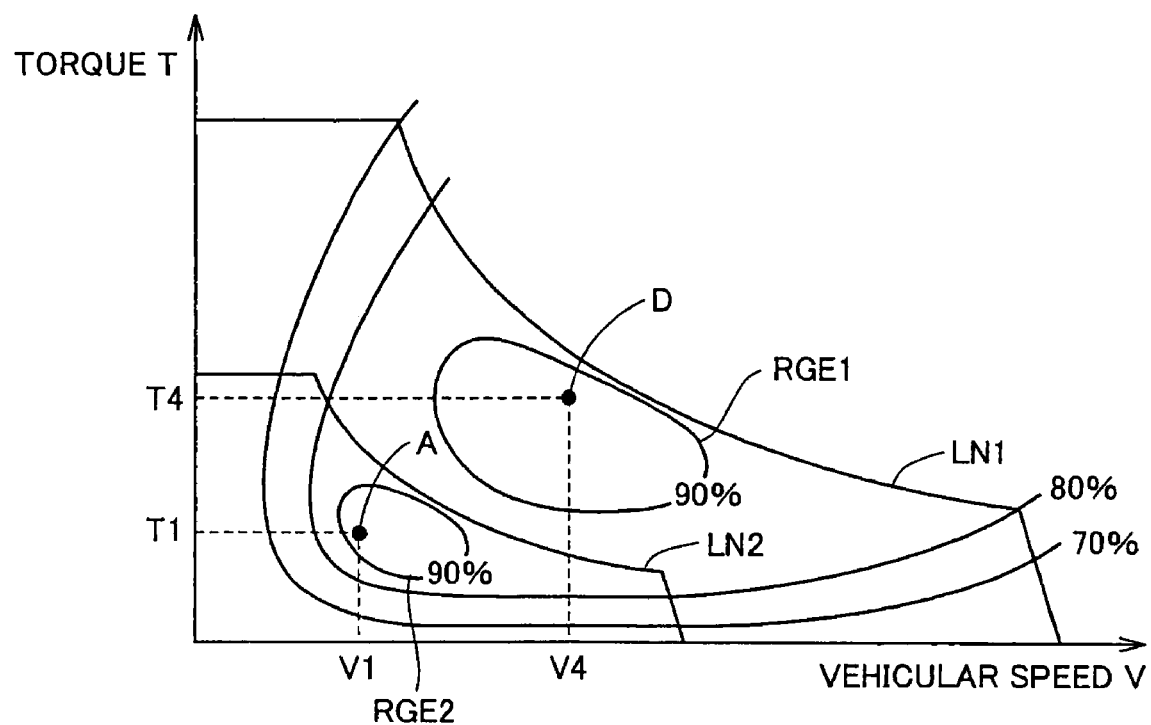
FIG. 5 shows characteristics in efficiency that motor generators MG2, MGR, MGL exhibit, respectively, with respect to torque output therefrom and vehicular speed V.

FIG. 5 shows characteristics in efficiency that motor generators MG2, MGR, MGL exhibit, respectively, with respect to torque output therefrom and vehicular speed V.

With reference to FIG. 5, a curve LN1 indicates a relationship between motor generator MG2's output torque and vehicular speed V. This relationship is obtained by converting a relationship between motor generator MG2's output torque and rotational speed by employing a speed reduction ratio of speed reducer RD. Furthermore the figure shows that the motor's efficiency is highest, i.e., at least 90%, in a range RGE1, and shows a tendency to gradually decrease therefrom to 80%, 70%, ... as it becomes farther away from range RGE1.

Furthermore in the figure a curve LN2 shows a relationship between motor generator MGR, MGL's output torque and vehicular speed V. Motor generators MGR and MGL are generally identical in build and subjected to approximately equal speed reduction ratios, respectively, and thus exhibit equivalent relationships, respectively. Furthermore the relationship is obtained by converting a relationship between motor generator MGR, MGL's output torque and rotational speed by employing a speed reduction ratio of speed reducer 8, 6. In the figure a range RGE2 indicates an output range maximizing motor generator MGR (or MGL) in efficiency (i.e., at least 90%).

Herein, as is apparent from FIG. 5, motor generator MG2 and motor generator MGR, MGL exhibit the maximum efficiency of at least 90% in different output ranges RGE1 and RGE2, respectively. More specifically, motor generator MG2 exhibits high efficiency in a relatively high output range (or for large torque and high vehicular speed), whereas motor generator MGR, MGL exhibits high efficiency in a relatively low output range (or for small torque and low vehicular speed).

Motor generator MG2 and motor generator MGR, MGL thus exhibit high efficiency in different output ranges, respectively, because the motor generators are configured to have different rated outputs, respectively, and also be drivable at different rotational speeds, respectively, for a specific vehicular speed V. Note that a rated output indicates a value of an output allowing a vehicle to be driven on a rated voltage and at a rated frequency while exhibiting the most satisfactory characteristic.

More specifically, motor generator MG2 has a relatively large rated output as it is a driving power source for front left and right wheel units FL, FR, whereas for motor generators MGR and MGL, motor generators are adopted that have a relatively small rated output that is sufficient to independently drive rear right wheel unit RR and rear left wheel unit RL. As the motor generators provide different outputs, respectively, they also exhibit different characteristics, respectively, in efficiency.

Furthermore, motor generator MG2 and motor generators MGR, MGL are coupled to independent drive shafts via speed reducers, respectively. Accordingly, for a specific vehicular speed V, motor generator MG2 and motor generators MGR, MGL will have their respective rotational speeds differently depending on a difference between speed reduction ratios. As the motor generators have such difference in rotational speed, their respective characteristics in efficiency will exhibit high efficiency in different output ranges, respectively.

Combining a plurality of motor generators that have different rated outputs, respectively, and are subjected to different speed reduction ratios, respectively, together to configure a drive system for vehicle 100 allows the present driving power control apparatus for a four wheel drive vehicle to achieve high efficiency in both a high output range and a low output range, as will be described hereinafter. This ensures high efficiency across a wide output range.

(1) Method of Determining How a Drive Torque Should be Allocated for Low Output Range As an example, it is assumed that when vehicle 100 is traveling at a vehicular speed V1, motor generators MG2, MGR, MGL as a whole are required to output a torque T1 as the motors' required drive torque TM* in accordance with how vehicle 100 is driven. Note that the motors' required drive torque TM* is the motors' required driving power PMreq* divided by vehicular speed V1.

The motors' required drive torque TM*=T1 and vehicular speed V1 are matched with the FIG. 5 characteristics in efficiency. If only motor generator MG2 is driven to alone output all of the motors' required drive torque TM*=T1, the motor generators' total efficiency is equal to that of motor generator MG2, i.e., approximately 80%, as indicated in the figure by a point A.

In contrast, if motor generators MG2, MGR, MGL are driven to output torques in total of T1, then the motor generators' total efficiency varies with how the drive torque is allocated between them, as shown in FIG. 6.

FIG. 6 shows a relationship between how a drive torque is allocated between motor generators MG2, MGR, MGL and the motor generators' total efficiency.

With reference to FIG. 6, for the motors' required drive torque TM*=T1 and vehicular speed V1, the motor generators' total efficiency varies with a ratio applied to allocate a driving power between motor generators MG2, MGR, MGL.

For example, if motor generators MGR, MGL are both driven to each output 50% of torque T1 while motor generator MG2 outputs 0% of torque T1, i.e., no torque, then, as indicated in the figure by a pattern A1, the motor generators' total efficiency will be 88%.

In contrast, if only motor generator MGR (or MGL) is driven to cause one of motor generators MGR, MGL to output all of the motors' required drive torque T1, then, as indicated in the figure by a pattern A2, the motor generators' total efficiency will increase to 92%.

Furthermore, if motor generators MG2, MGR, MGL are driven to cause motor generators MGR, MGL to together output 80% of torque T1 and cause motor generator MG2 to output 20% of torque T1, then, as indicated by patterns A3 and A4, the motor generators' total efficiency will decrease. If only motor generator MG2 is driven to alone output all (or 100%) of torque T1, then, as indicated in the figure by a pattern An, the motor generators' total efficiency will be 80%.

As is apparent from the FIG. 6 relationship, a decision is made in accordance with pattern A2 that an allocation of a drive torque that is determined so that motor generator MG2 and one of motor generators MGR and MGL output no torque and the other of motor generators MGR and MGL outputs torque TM* can maximize the motors' total efficiency.

Accordingly, if the mileage oriented mode is selected as traveling mode DM, and the motors' required drive torque TM*=T1 is requested for vehicular speed V1, driving power allocation determination unit 62 in response sets a ratio of 100%:0%:0% as a ratio applied to allocate a driving power between motor generators MGR, MGL, MG2 and determines each motor generator's required drive torque in accordance with the set ratio. Note that this causes vehicle 100 to travel with one wheel unit driven, i.e., only rear right wheel unit RR serving as a drive wheel unit.

Thus when the motors' required driving power PMreq* is relatively small, how a drive torque should be allocated between motor generators MG2, MGR, MGL can be determined to mainly drive motor generators MGR, MGL that exhibit high efficiency in a low output range to improve the motor generators' total efficiency. In particular, traveling with one of motor generators MGR and MGL serving as a motive power source and traveling with both motor generators MGR and MGL serving as a motive power source, that are selectable in accordance with the motors' required driving power PMreq*, can further enhance the motor generators' total efficiency.

(2) Method of Determining How a Drive Torque Should Be Allocated for High Output Range As an example for the motors' required driving power PMreq* having a relatively large value, a case will now be considered in which vehicle 100 is traveling at a vehicular speed V4 (>V1) and motor generators MG2, MGR, MGL as a whole are required to output a torque T4 (>T1) as the motors' required drive torque TM*.

The motors' required drive torque TM*=T4 and vehicular speed V4 are matched with the FIG. 5 characteristics in efficiency. If only motor generator MG2 is driven to alone output all of the motors' required drive torque TM*=T4, the motor generators' total efficiency is equal to that of motor generator MG2, i.e., at least 90%, as indicated in the figure by a point D.

In contrast, if motor generators MG2, MGR, MGL are driven to output torques in total of T4, then the motor generators' total efficiency varies with what ratio is applied to allocate the drive torque between them, as shown in FIG. 7.

FIG. 7 shows a relationship between how a drive torque is allocated between motor generators MG2, MGR, MGL and the motor generators' total efficiency.

With reference to FIG. 7, If only motor generator MG2 is driven to alone output all (or 100%) of torque T4, then, as indicated in the figure by a pattern D1, the motor generators' total efficiency will be 92%.

In contrast, if motor generators MG2, MGR, MGL are driven to cause motor generators MGR, MGL to output 10% of torque T4 and motor generator MG2 to output the remainder, i.e., 90%, then, as shown in the figure by a pattern D2, the motor generators' total efficiency will be 85%, and for larger ratios applied to allocate a drive torque to motor generators MGR and MGL, the motor generators' total efficiency varies as indicated in the figure by patterns D3-Dm.

Note that in FIG. 7, the ratio applied to allocate a drive torque to motor generators MGR, MGL is limited to less than 50%. This is in order to prevent vehicle 100 from destabilizing in behavior as the FF based four wheel drive vehicle having front left and right wheel units FL, FR as main drive wheel units is urgently altered to be FR based with rear left and right wheel units RL, RR serving as main drive wheel units as a result of prioritizing efficiency.

More specifically, if efficiency is prioritized and the ratio applied to allocate a drive torque to motor generators MGR, MGL is determined to be at least 50%, then vehicle 100 will substantially be altered to an FR based four wheel drive vehicle. This causes the FF based four wheel drive vehicle's cornering ability, which inherently has a large tendency to understeer, to have an increased tendency to oversteer, and when vehicle 100 turns, it may destabilize in behavior.

Accordingly, for FF based four wheel drive vehicle, the ratio applied to allocate a drive torque to motor generators MGR, MGL is limited to less than 50% to prevent the vehicle from destabilizing in behavior when it turns.

Thus in accordance with the FIG. 7 relationship it can be seen that vehicular speed V4 and required drive torque TM*=T4 can be satisfied with highest efficiency by determining an allocation of a drive torque in accordance with pattern D1.

Accordingly, if the mileage oriented mode is selected as traveling mode DM, and the motors' required drive torque TM*=T4 is requested for vehicular speed V4, driving power allocation determination unit 62 in response sets a ratio of 0%:0%:100% as a ratio applied to allocate a driving power between motor generators MGR, MGL, MG2 and determines each motor generator's required drive torque in accordance with the set ratio.

(3) Correcting Allocation of Drive Torque

Thus the motor generators' total efficiency can be held high across a wide output range by determining an allocation of a drive torque between motor generators MG2, MGR, MGL so as to maximize the motor generators' total efficiency, as based on the motors' required driving power PMreq* and a characteristic in efficiency of each motor generator with respect to its torque and vehicular speed, for each of low and high output ranges.

However, if vehicle 100 is turning, driving both motor generators MGR and MGL with rear left and right wheel units RL, RR rotating at different speeds $\omega RL$, $\omega RR$ causes between output torques a difference attributed to that between the rotational speeds, resulting in vehicle 100 having an impaired cornering ability.

Accordingly, if a decision is made from steering angle $\theta s$ of handle 7 received from steering angle sensor 56 that vehicle 100 is currently turning, then driving power allocation determination unit 62 corrects a ratio applied to allocate a drive torque, as determined as described above at items (1) and (2), to allow vehicle 100 to turn smoothly.

More specifically, driving power allocation determination unit 62 corrects a ratio applied to allocate a drive torque between motor generators MGL, MGR driving rear left and right wheel units RL, RR, respectively, to cause a wheel unit located outwardly of a direction in which the vehicle turns to serve as a drive wheel unit, and to cause a wheel unit located inwardly of the direction in which the vehicle turns to serve as an idler wheel unit.

For example, if a decision is made from steering angle $\theta s$ of handle 7 that vehicle 100 is currently turning right, then, drive torque allocation determination unit 62 corrects a ratio applied to allocate a drive torque between motor generators MGL, MGR to drive only a wheel unit located outwardly of the direction in which the vehicle turns, i.e., rear left wheel unit RL, and also cause a wheel unit located inwardly of the direction in which the vehicle turns, i.e., rear right wheel unit RR to be an idler.

Furthermore, if a decision is made from steering angle $\theta s$ of handle 7 that vehicle 100 is currently turning left, then, driving power allocation determination unit 62 corrects a ratio applied to allocate a drive torque between motor generators MGL, MGR to drive only a wheel unit located outwardly of the direction in which the vehicle turns, i.e., rear right wheel unit RR, and also cause a wheel unit located inwardly of the direction in which the vehicle turns, i.e., rear left wheel unit RL to be an idler.

Furthermore if that a wheel unit slips is detected, driving power allocation determination unit 62 also corrects a determined ratio applied to allocate a drive torque and thus optimizes gripping a road surface. More specifically, driving power allocation determination unit 62 corrects a ratio applied to allocate a drive torque to reduce a driving power transmitted to the wheel unit for which slipping is detected.

Thus when the mileage oriented mode is selected as traveling mode DM, driving power allocation determination unit 62 determines how a drive torque should be allocated between motor generators MG2, MGR, MGL to maximize the motor generators' total efficiency for the motors' required driving power PMreq* given.

Figure 8:
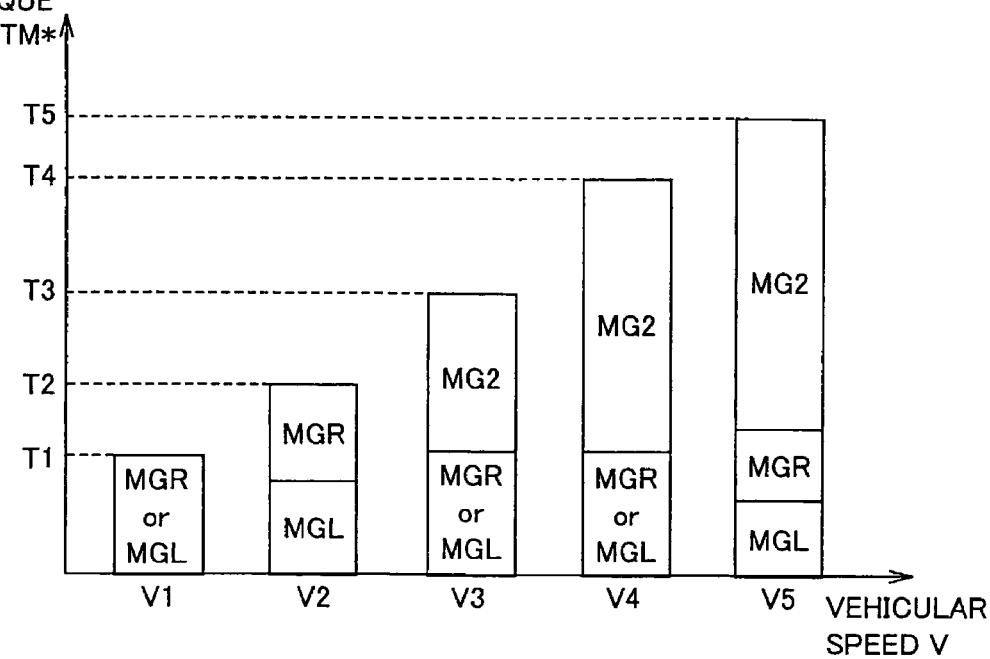
FIG. 8 shows a relationship in a mileage oriented mode between the motors' required drive torque TM* and vehicular speed V, and drive torque allocation.

Note that how a drive torque should be allocated is actually determined by extracting a drive torque allocation that corresponds to the motors' required drive torque TM* and vehicular speed V, as given, from a held map of a relationship between the motors' required drive torque TM* and vehicular speed V and drive torque allocation, as shown in FIG. 8. In the FIG. 8 relationship, each drive torque allocation set for a value of the motors' required drive torque TM* and a value of vehicular speed V is predetermined in accordance with the method as described above at items (1) and (2).

From the determined drive torque allocation and the motors' required drive torque TM*, driving power allocation determination unit 62 calculates torque control values TR1, TR2 for motor generators MG1, MG2, and motor generators MGR, MGL's required drive torques TRR*, TRL*. Driving power allocation determination unit 62 outputs the calculated torque control values TR1, TR2 to converter control means 68 and inverter control means 70, 72, and outputs the wheel units' respective, individually required drive torques TRR*, TRL*, as calculated, to inverter control means 74, 76, respectively.

[2] Method of Determining How Required Drive Torque Should Be Allocated in Dynamics Oriented Mode Hereinafter will be described a method of determining how a drive torque should be allocated when the dynamics oriented mode is selected as traveling mode DM.

Initially, as has been described above at item [1]-(1), it is assumed that when vehicle 100 is traveling at vehicular speed V1, motor generators MG2, MGR, MGL as a whole are required to output torque T1 as the motors' required drive torque TM* in accordance with how vehicle 100 is driven.

With reference again to FIG. 6, when a decision is made that traveling mode DM is the dynamics oriented mode, driving power allocation determination unit 62 selects from a plurality of drive torque allocation patterns allowing the motor generators' total efficiency to be at least a preset predetermined threshold value a pattern allowing vehicle 100 to best stabilize in behavior in accordance with a condition that vehicle 100 assumes in traveling. Note that the condition that vehicle 100 assumes in traveling is detected as based on outputs issued by a variety of sensors and input to driving power allocation determination unit 62 (such as accelerator pedal position AP, brake pedal position BP, shift position SP, rotational speeds $\omega$FL, $\omega$FR, $\omega$RL, $\omega$RR of wheel units FL, FR, RL, RR, steering angle $\theta$s of handle 7, yaw rate $\gamma$ and the like).

More specifically, driving power allocation determination unit 62 for example presets the motor generators' total efficiency of 87% as the predetermined threshold value, and extracts any patterns equal to or larger than the threshold value of 87% from the plurality of patterns A1-An having different drive torque allocation ratios as shown in FIG. 6. In the FIG. 6 example, patterns A1, A2 are extracted.

For the extracted patterns A1, A2, driving power allocation determination unit 62 presets evaluation values indicating levels of stability in behavior of vehicle 100 for a variety of assumed conditions that vehicle 100 assumes in traveling.

As one example, if vehicle 100 is traveling straight forward, a high evaluation value is set for pattern A1 allocating a drive torque between motor generators MGR, MGL equally, as vehicle 100 attains a high level of stability in behavior. For pattern A2 allocating a drive torque to only one of motor generators MGR, MGL to drive it, a low evaluation value is set, as vehicle 100 less stabilizes in behavior.

As another example, if vehicle 100 is turning, a high evaluation value is set for pattern A2 allocating a drive torque to only one of motor generators MGR, MGL to drive it, whereas for pattern A1 allocating a drive torque between motor generators MGR, MGL equally, a low evaluation value is set.

Thus for each extracted one of a plurality of patterns an evaluation value is preset in accordance with each condition that vehicle 100 assumes in traveling, and when vehicle 100 is traveling at vehicular speed V1 and the motors' required drive torque TM*=T1 is requested, driving power allocation determination unit 62 selects from patterns A1, A2 one pattern having the highest evaluation value for a condition that vehicle 100 assumes in traveling. In accordance with a drive torque allocation ratio indicated by the selected pattern, driving power allocation determination unit 62 determines an allocation of a drive torque between motor generators MG2, MGR, MGL.

Now, similarly as has been described above at item [1]-(2), it is assumed that when vehicle 100 is traveling at vehicular speed V4 (>V1), motor generators MG2, MGR, MGL as a whole are required to output torque T4 (>T1) as the motors' required drive torque TM*.

In this case also, driving power allocation determination unit 62 extracts any patterns equal to or larger than the threshold value of 87% from the plurality of patterns D1-Dn having the different drive torque allocation ratios as shown in FIG. 7. In the FIG. 7 example, patterns D1, D4-Dm are extracted.

For the extracted patterns D1, D4-Dm, driving power allocation determination unit 62 presets evaluation values indicating levels of stability in behavior of vehicle 100 for a variety of assumed conditions that vehicle 100 assumes in traveling.

As one example, when vehicle 100 is traveling straight forward, a highest evaluation value is set for pattern Dm allocating a drive torque to motor generators MGR, MGL at the highest ratio, as vehicle 100 attains a high level of stability in behavior. This is based on that in traveling straight forward, driving wheel units FR, FL, RR, RL with generally equal torques can provide higher stability.

In contrast, when vehicle 100 is turning, a highest evaluation value is set for pattern D1 allocating a drive torque to motor generator MG2 at the highest ratio, as vehicle 100 attains a high level of stability in behavior. This is based on that for an FF based four wheel drive vehicle inherently having a cornering ability with a large tendency to understeer, allocating more driving power to a front wheel unit further increases the tendency to understeer and more stabilizes vehicle 100 in behavior.

Furthermore, when vehicle 100 travels a low $\mu$ road, a highest evaluation value is set for pattern Dm allocating a drive torque to motor generators MGR, MGL at the highest ratio, as vehicle 100 attains a high level of stability in behavior. This is based on that allocating more driving power to a rear wheel unit to allow the vehicle to serve as a four wheel drive vehicle enhances the vehicle's road ability on a slippable road surface.

When vehicle 100 is traveling at vehicular speed V4 and the motors' required drive torque TM*=T4 is requested, driving power allocation determination unit 62 selects from patterns D1, D4-Dm a single pattern having the highest evaluation value for a condition assumed by vehicle 100 in traveling, and determines how the drive torque should be allocated between motor generators MG2, MGR, MGL in accordance with a drive torque allocation ratio indicated by the selected pattern.

Figure 9:
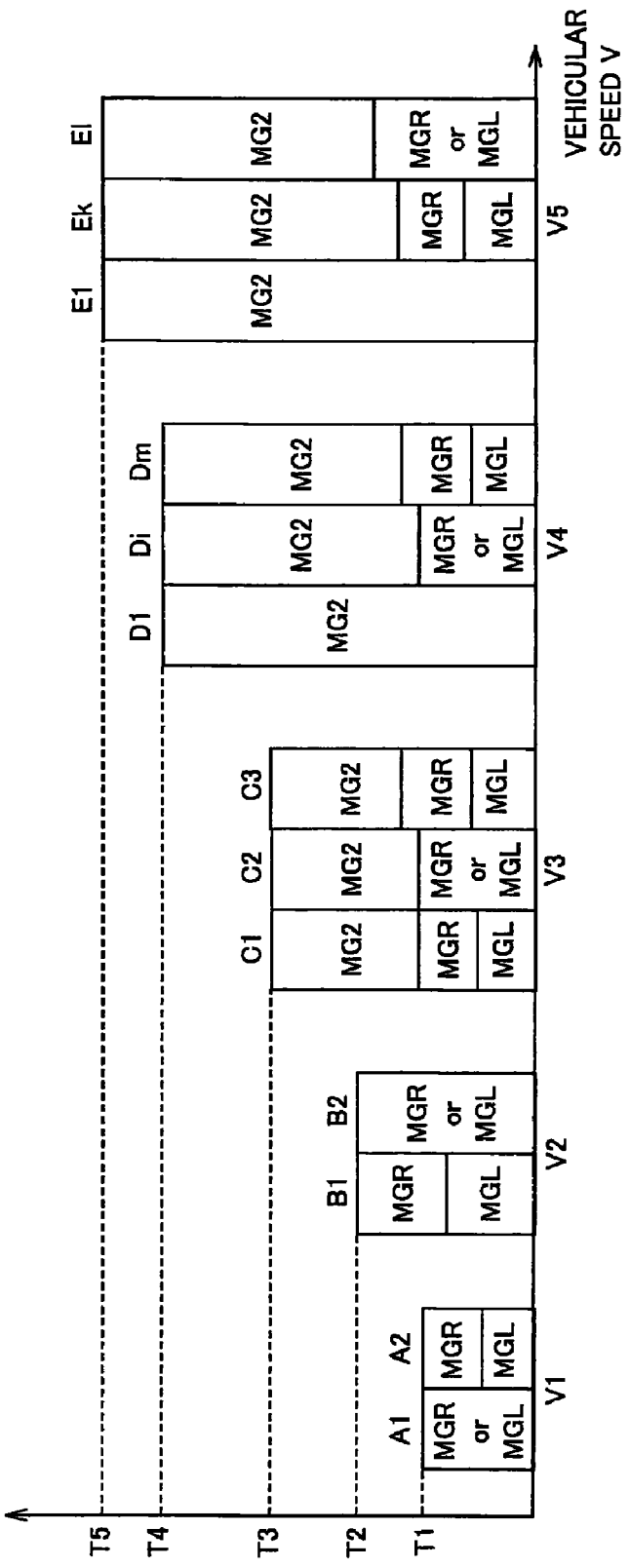
FIG. 9 shows a relationship in a dynamics oriented mode between the motors' required drive torque TM* and vehicular speed V, and drive torque allocation.

Note that how the drive torque is allocated is actually determined by extracting a drive torque allocation that corresponds to the motors' required drive torque TM*, vehicular speed V, and a condition that vehicle 100 assumes in traveling, as given, from a held map of a relationship between the motors' required drive torque TM* and vehicular speed V and drive torque allocation, as shown in FIG. 9.

In the FIG. 9 relationship, for each value of the motors' required drive torque TM* and each value of vehicular speed V, a plurality of drive torque allocations are determined, as predetermined in the above described method by selecting, for each condition that vehicle 100 assumes in traveling, a pattern of a plurality of drive torque allocation patterns allowing the motor generators' total efficiency to have at least a predetermined threshold value, that has a highest evaluation value.

Driving power allocation determination unit 62 calculates torque control values TR1, TR2 for motor generators MG1, MG2, and motor generators MGR, MGL's required drive torques TRR*, TRL*, as based on the determined drive torque allocation and the motors' required drive torque TM*. Driving power allocation determination unit 62 outputs the calculated torque control values TR1, TR2 to converter control means 68 and inverter control means 70, 72 and also outputs the wheel units' respective, individually required drive torques TRR*, TRL*, as calculated, to inverter control means 74, 76, respectively.

Figure 10:
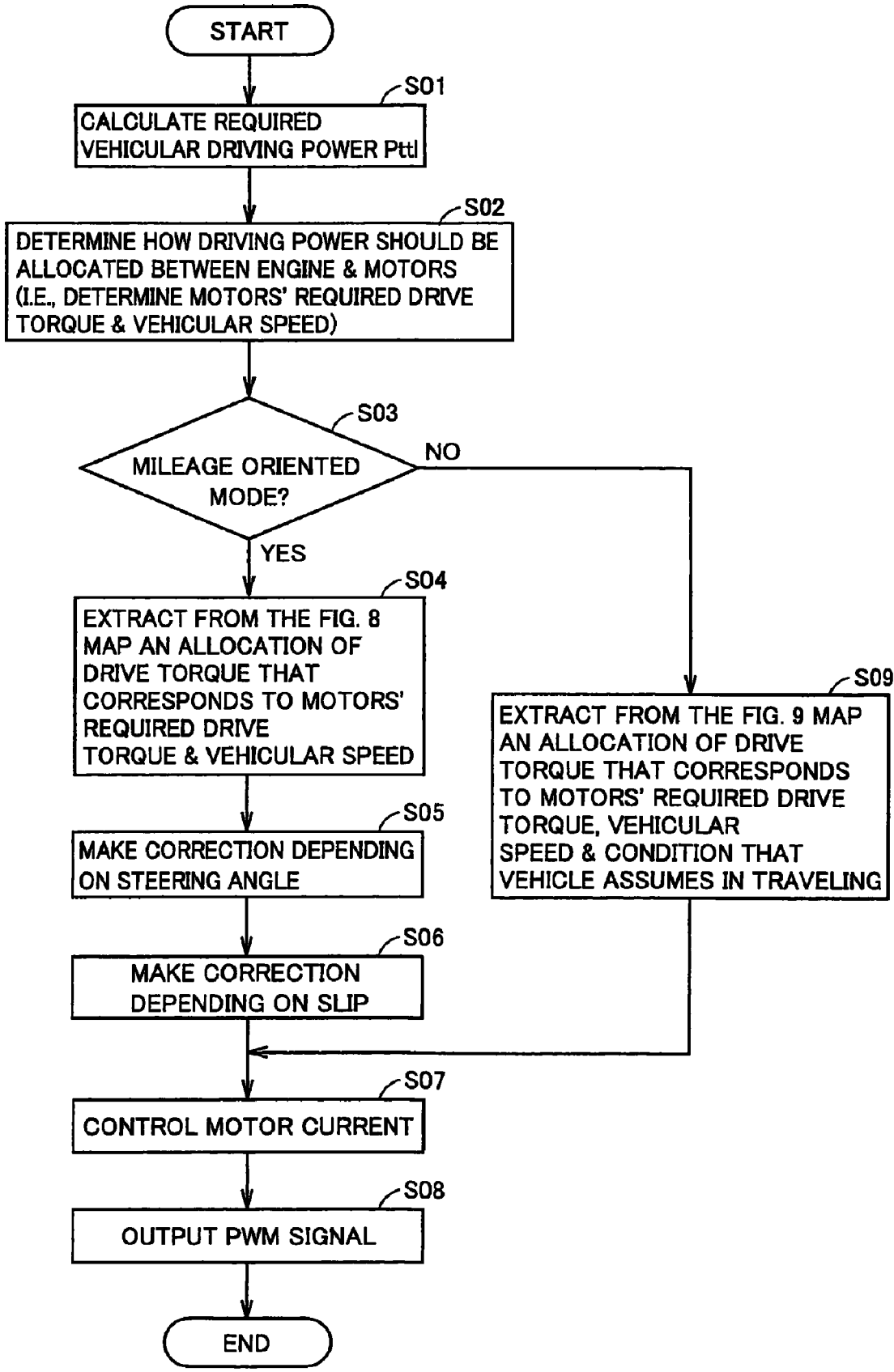
FIG. 10 is a flowchart for illustrating controlling a driving power of a four wheel drive vehicle in an embodiment of the present invention.

FIG. 10 is a flowchart for illustrating controlling a driving power of a four wheel drive vehicle in an embodiment of the present invention.

With reference to FIG. 10, initially, from a variety of sensors, information of an operation by the driver (such as accelerator pedal position AP, shift position SP, brake pedal position BP and steering angle θs and the like) is input to ECU 30. In response, required vehicular driving power calculation unit 60 internal to ECU 30 calculates required vehicular driving power Pttl from these sensors' inputs (step S01). The calculated, required vehicular driving power Pttl is output to driving power allocation determination unit 62.

Subsequently, driving power allocation determination unit 62 determines for the calculated, required vehicular driving power Pttl how driving power should be allocated between engine ENG and all of motor generators MG2, MGR, MGL in accordance with a condition that vehicle 100 assumes in traveling (step S02). More specifically, driving power allocation determination unit 62 determines engine ENG's required driving power PEreq* and motor generators MG2, MGR, MGL's total, required driving power PMreq*, and determines the motors' required drive torque TM* and vehicular speed V corresponding to the motors' required driving power PMreq* as determined.

Driving power allocation determination unit 62 determines how the drive torque should be allocated between motor generators MG2, MGR, MGL, as based on the motors' required drive torque TM* and vehicular speed V, and a characteristic in efficiency of each of motor generators MG2, MGR, MGL with respect to its torque and vehicular speed V.

More specifically, initially, driving power allocation determination unit 62 determines from a signal DM received from traveling mode setting unit 64 whether the mileage oriented mode is selected as traveling mode DM (step S03). If so, driving power allocation determination unit 62 proceeds to step S04 to extract from the FIG. 8 map a drive torque allocation corresponding to the motors' required drive torque TM* and vehicular speed V (step S04).

Subsequently, if a decision is made from steering angle θs of handle 7, as received from steering angle sensor 56, that vehicle 100 is turning, driving power allocation determination unit 62 corrects the drive torque allocation ratio that has been extracted at step S04 to allow vehicle 100 to turn smoothly (step S05).

Furthermore, when that a wheel unit slips is detected, driving power allocation determination unit 62 corrects the drive torque allocation ratio that has been extracted at step S04 to reduce a driving power transmitted to the wheel unit for which slipping is detected (step S06), and driving power allocation determination unit 62 determines the drive torque allocation ratio that has been corrected through steps S05, S06 as an allocation of the drive torque between motor generators MG2, MGR, MGL.

With reference again to step S03, if a decision is made that the mileage oriented mode is not selected as traveling mode DM, driving power allocation determination unit 62 determines that the dynamics oriented mode is selected as traveling mode DM, and proceeds to step S09. Driving power allocation determination unit 62 extracts from the FIG. 9 map a drive torque allocation corresponding to the motors' required drive torque TM* and vehicular speed V and to a condition that vehicle 100 assumes in traveling, and driving power allocation determination unit 62 determines the extracted drive torque allocation as an allocation of the drive torque between motor generators MG2, MGR, MGL.

Driving power allocation determination unit 62 calculates torque control values TR1, TR2 for motor generators MG1, MG2 and motor generators MGR, MGL's required drive torques TRR*, TRL* from the drive torque allocation, as determined through steps S04-S06 and S09 and the motors' required drive torque TM*. Driving power allocation determination unit 62 outputs the calculated torque control values TR1, TR2 to converter control means 68 and inverter control means 70, 72, and also outputs the wheel units' respective, individually required drive torques TRR*, TRL*, as calculated, to inverter control means 74, 76, respectively.

Thus, a motor driving current is controlled by inverters 14, 31, 20L, 20R (step S07). Inverters 14, 31, 20L, 20R each have IGBT devices Q3-Q8 controlled to switch in response to signals PWMI1, PWMI2, PWMIR, PWMIL output from inverter control means 70, 72, 74, 76, respectively. Thus motor generators MG1, MG2 output torques in accordance with torque control values TR1, TR2, respectively. Furthermore, motor generators MGR, MGL output torques in accordance with required drive torques TRR*, TRL*, respectively (step S08).

Thus in accordance with the present invention in an embodiment a four wheel drive vehicle has a main drive wheel unit and an idler wheel unit driven by motor generators configured with different rated outputs, respectively, and different speed reduction ratios, respectively. Accordingly, in their respective characteristics in efficiency with respect to torque and vehicular speed, the motor generators exhibit high efficiency in different ranges, respectively. Accordingly, the motor generators' total efficiency can be held high across a high-to-low, wide output range by appropriately determining an allocation of a drive torque between the motor generators so as to increase the motor generators' total efficiency in accordance with the motors' total, required drive torque and vehicular speed. As a result the four wheel drive vehicle can be improved in mileage.

[First Exemplary Variation]

The present invention in one embodiment provides a driving power control apparatus for a four wheel drive vehicle that allows idler wheel units implemented by rear left and right wheel units RL, RR and main drive wheel units implemented by front left and right wheel units FL, FR to be driven by motor generators MGL, MGR and motor generator MG2 respectively, that have their respective maximum efficiency ranges in different output ranges, respectively. This is attributed to the fact that, as has been described above, motor generator MGR, MGL and motor generator MG2 have different rated outputs, respectively, and are subjected to different speed reduction ratios, respectively.

More specifically, the speed reduction ratio for motor generators MGR, MGL can be set independently of that for motor generator MG2. Accordingly, the speed reduction ratio for motor generators MGR, MGL can be changed to adjust, as desired, an output range in which their maximum efficiency can be obtained.

Thus, as described in the present exemplary variation, optimizing each speed reduction ratio in accordance with a traveling performance that vehicle 100 is required to have can ensure that a wide variety of types of vehicles each having different traveling performance can have unique traveling performance, and can also improve the vehicles in mileage.

Figure 11:
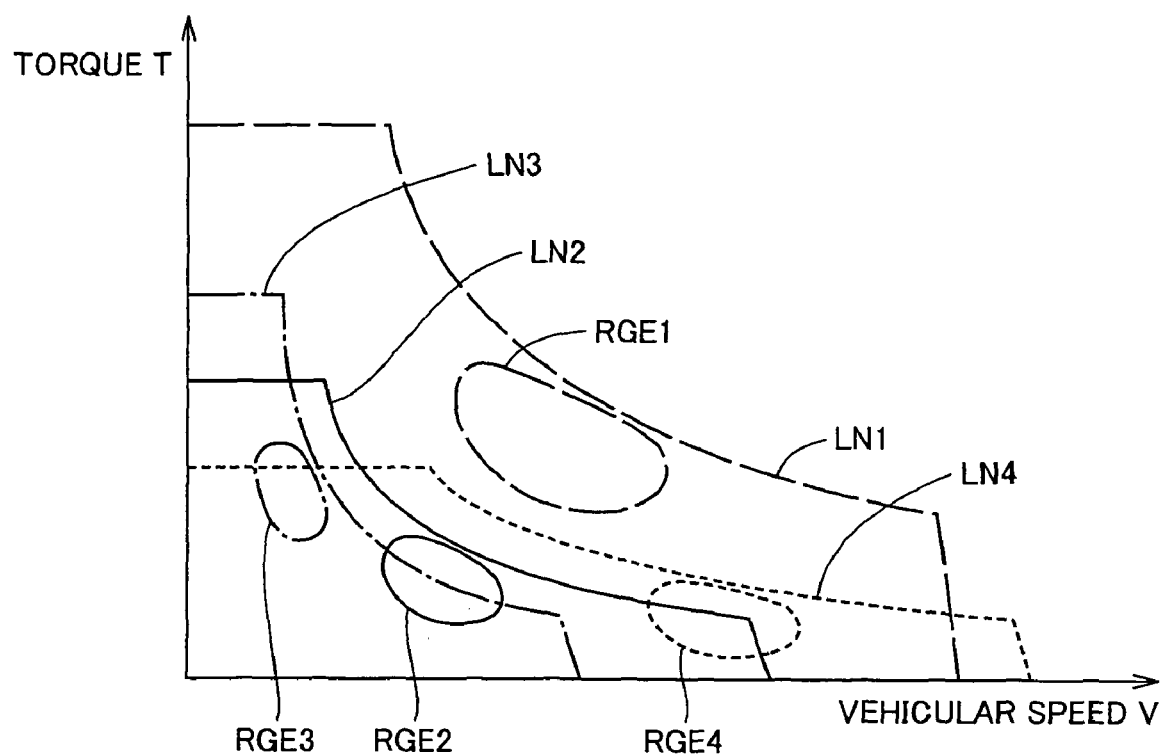
FIG. 11 shows characteristics in efficiency that motor generators MG2, MGR, MGL exhibit with respect to torque and vehicular speed in a first exemplary variation of an embodiment of the present invention.

FIG. 11 shows characteristics in efficiency that motor generators MG2, MGR, MGL exhibit with respect to torque output therefrom and vehicular speed in a first exemplary variation of an embodiment of the present invention.

With reference to FIG. 11, a curve LN1 shows a relationship that motor generator MG2 has between its output torque and vehicular speed V. Furthermore in the figure a range RGE1 indicates a range allowing motor generator MG2 to exhibit an efficiency of at least 90%.

In contrast, motor generator MGR, MGL has a relationship between its output torque and vehicular speed V, that is developed into three relationships indicated in the figure by curves LN2-LN4 by changing a speed reduction ratio.

More specifically, when a speed reduction ratio is decreased to be smaller than a reference value provided by a speed reduction ratio that provides the relationship indicated in the figure by curve LN2, the motor generator's output torque and vehicular speed V have a relationship indicated in the figure by curve LN4.

In contrast, when a speed reduction ratio is increased to be larger than the reference value, the motor generator's output torque and vehicular speed V have a relationship indicated in the figure by curve LN3.

As a speed reduction ratio is increased or decreased, a maximum efficiency range transitions to a low vehicular speed range or a high vehicular speed range. More specifically, increasing a speed reduction ratio causes a maximum efficiency range to transition to a high vehicular speed range, as indicated in the figure by a range RGE4, and decreasing a speed reduction ratio causes a maximum efficiency range to transition to a low vehicular speed range, as indicated in the figure by a range RGE3.

Thus the present exemplary variation provides a driving power control apparatus for a four wheel drive vehicle, that is characterized by setting a speed reduction ratio for motor generators MGR, MGL so that an output range on which the type of vehicle of interest places prime importance and a range allowing motor generators MGR, MGL to exhibit maximum efficiency overlap. This can ensure a traveling performance unique to the type of vehicle of interest and also achieve further improved mileage.

More specifically, for a type of vehicle that places prime importance on cruising at high speed, the speed reduction ratio for motor generators MGR, MGL is set at a relatively low value to have a maximum efficiency operation range in a high vehicular speed range (corresponding in the figure to range RGE4). This can provide high drive efficiency in a high vehicular speed range on which the type of vehicle of interest places prime importance, and also achieve further improved mileage.

In contrast, for a type of vehicle that places prime importance on driving power for low speed, such as responsiveness when the vehicle drives off, the speed reduction ratio for motor generators MGR, MGL is set at a relatively high value to have a maximum efficiency operation range in a low vehicular speed range (corresponding in the figure to range RGE3). This can provide high drive efficiency in a low vehicular speed range on which the type of vehicle of interest places prime importance, and accordingly achieve further improved mileage.

Thus high traveling performance and high mileage performance can both be established for a variety of types of vehicles by a optimizing a speed reduction ratio for a motor generator that is coupled to an idler wheel unit in accordance with a traveling performance on which each type of vehicle places prime importance.

[Second Exemplary Variation]

Figure 12:
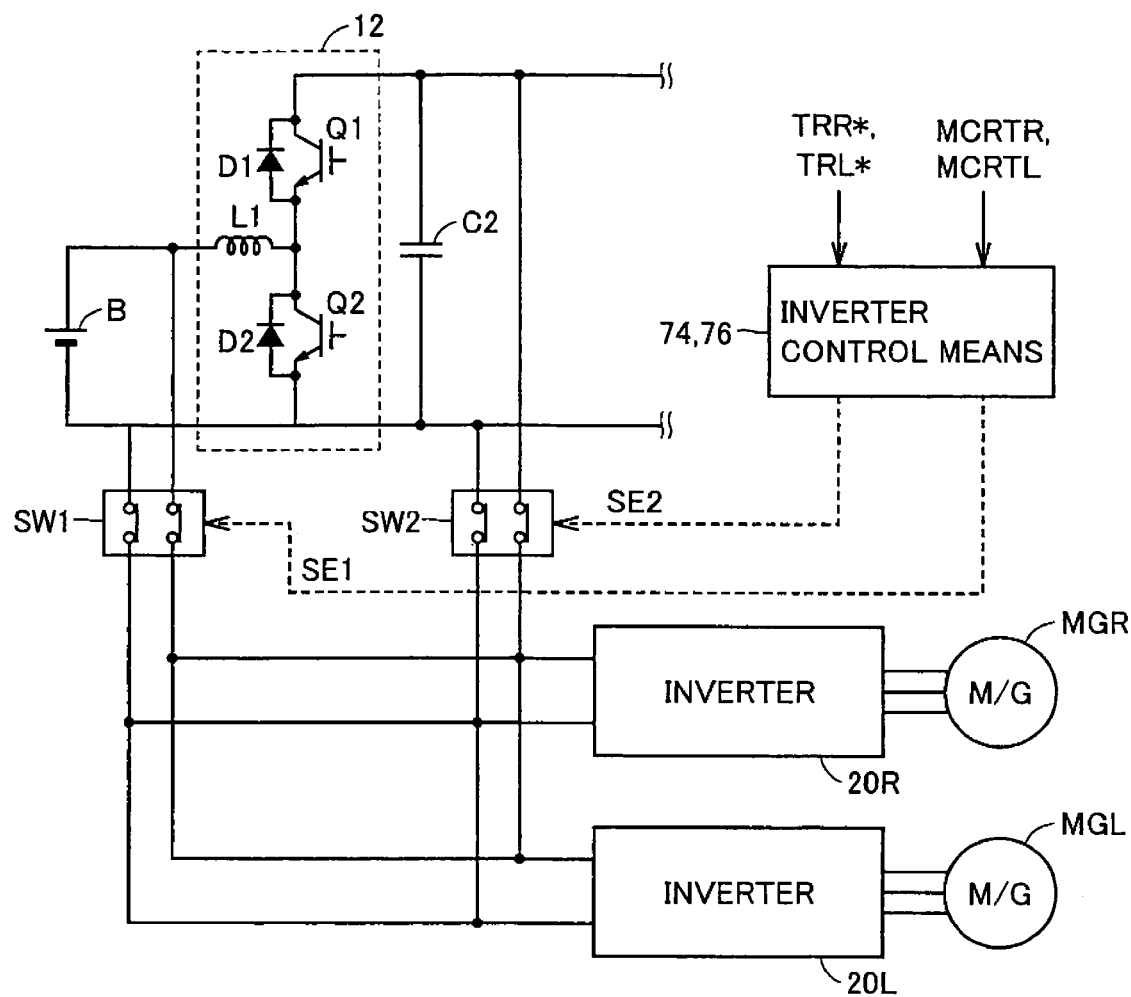
FIG. 12 is a schematic block diagram of a drive device in a driving power control apparatus in a second exemplary variation of the embodiment of the present invention.

FIG. 12 is a schematic block diagram of a drive device in a driving power control apparatus in a second exemplary variation of the embodiment of the present invention. The FIG. 12 drive device corresponds to the FIG. 2 drive device plus switch circuits SW1, SW2. Accordingly, their mutually common components will not be shown nor specifically be described.

With reference to FIG. 12, switch circuit SW1 is disposed between battery B and inverters 20R, 20L. Switch circuit SW1 is brought into/out of conduction in response to a signal SE1 issued from inverter control means 74, 76 to electrically connect or disconnect battery B and inverters 20R, 20L.

Switch circuit SW2 is disposed between capacitor C2 and inverters 20R, 20L. Switch circuit SW2 is brought into/out of conduction in response to a signal SE2 issued from inverter control means 74, 76 to electrically connect or disconnect capacitor C2 and inverters 20R, 20L. Switch circuits SW1, SW2 are implemented for example by relays.

Switch circuit SW1 and switch circuit SW2 are complementarily brought into/out of conduction by signals SE1, SE2 generated as based on motor generators MGR, MGL's required drive torques TRL*, TRR* and motor speeds MCRTR, MCRTL input to inverter control means 74, 76

More specifically, when inverter control means 74, 76 receive motor generators MGR, MGL's required drive torques TRR*, TRL* from driving power allocation determination unit 62, and motor speeds MCRTR, MCRTL from a speed sensor (not shown), inverter control means 74, 76 calculate a target value from these input signals for a voltage input to inverters 20R, 20L.

Subsequently, inverter control means 74, 76 determine whether the calculated target value exceeds a predetermined threshold value. Note that the predetermined threshold value is set at a voltage approximately equal to direct current voltage Vb provided from battery B. If inverter control means 74, 76 determine that the target value exceeds the predetermined threshold value, then inverter control means 74, 76 generate signal SE1 for bringing switch circuit SW1 out of conduction and signal SE2 for bringing switch circuit SW2 into conduction. Inverter control means 74, 76 output the generated signals SE1, SE2 to switch circuits SW1, SW2, respectively.

Thus, only switch circuit SW2 is brought into conduction and capacitor C2 and inverters 20R, 20L are electrically connected together. Thus inverters 20R, 20L receive direct current voltage Vb from battery B upconverted via upconverter 12 to control driving motor generators MGR, MGL.

If the target value does not exceed the predetermined threshold value, then inverter control means 74, 76 generate signal SE1 for bringing switch circuit SW1 into conduction and signal SE2 for bringing switch circuit SW2 out of conduction. Inverter control means 74, 76 output the generated signals SE1, SE2 to switch circuits SW1, SW2, respectively.

Thus, only switch circuit SW1 is brought into conduction and battery B and inverters 20R, 20L are electrically connected together. Thus inverters 20R, 20L receive direct current voltage Vb from battery B to control driving motor generators MGR, MGL.

Thus the present exemplary variation provides a driving power control apparatus that is characterized by selectively connecting inverters 20R, 20L to one of battery B and capacitor C2 in accordance with the magnitude of a driving power that motor generators MGR, MGL are required to output.

The driving power control apparatus of the present exemplary variation thus configured can ensure driving power that vehicle 100 requires to travel, and also achieve further improved mileage.

More specifically, if motor generators MGR, MGL are required to output relatively large driving power, direct current voltage Vb provided from battery B can be upconverted and thus supplied to inverters 20R, 20L to drive generators MGR, MGL on high voltage to obtain a large motor output.

In contrast, if motor generators MGR, MGL are required to output relatively small driving power, direct current voltage Vb provided from battery B can be supplied directly to inverters 20R, 20L, rather than via upconverter 12. This can reduce a loss caused in upconverter 12 and also ensure a desired motor output. This can ensure a driving power that the vehicle requires to travel, and also reduce or prevent a loss of the drive device, and hence achieve further improved mileage.

[Third Exemplary Variation]

The present invention in an embodiment provides a driving power control apparatus for a four wheel drive vehicle other than the FIG. 1 FF based four wheel drive vehicle 100. More specifically, it is also applicable to an FR based four wheel drive vehicle 110 shown in FIG. 13.

Figure 13:
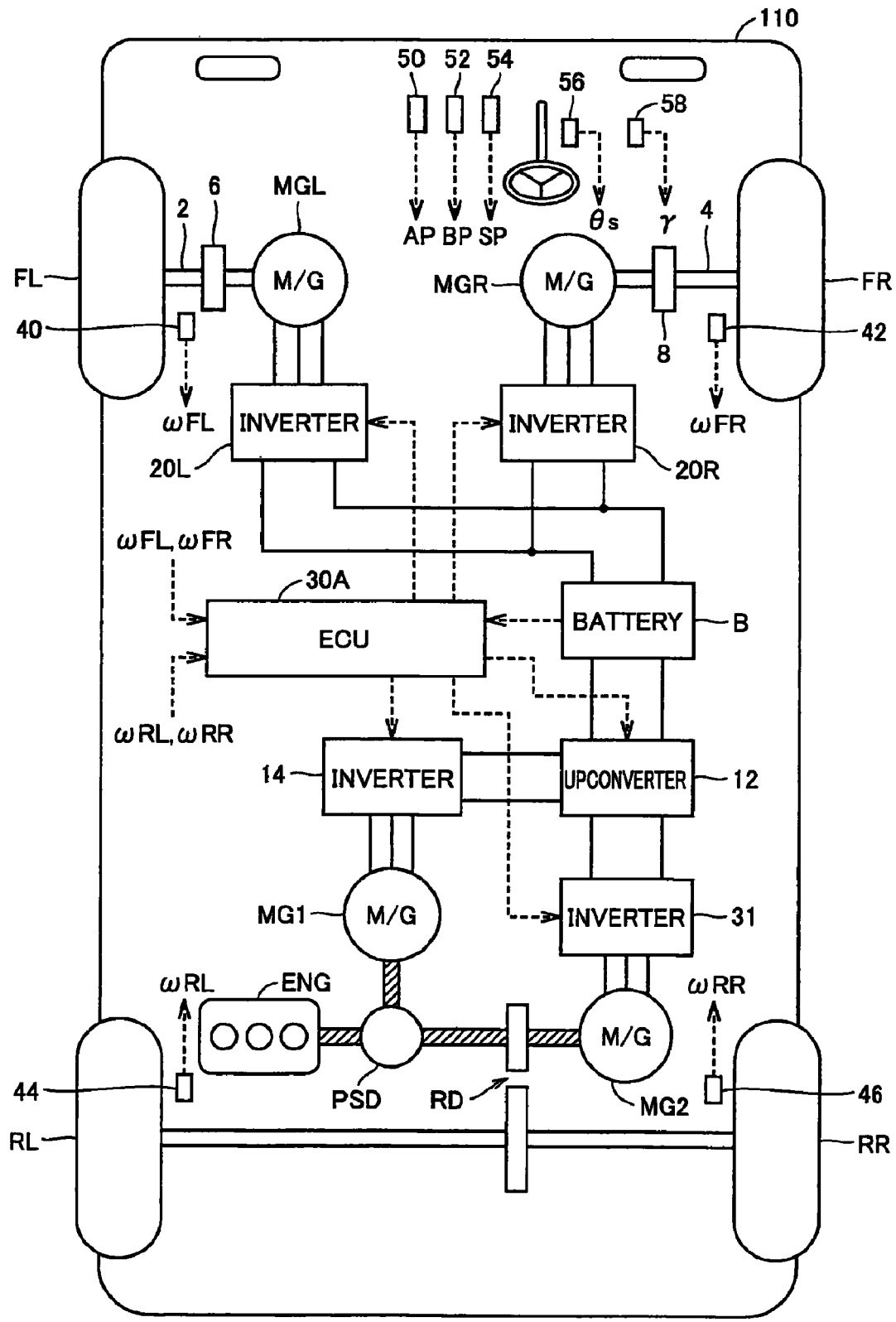
FIG. 13 is a schematic block diagram of a drive system of a vehicle having mounted therein the driving power control apparatus for a four wheel drive vehicle in the embodiment of the present invention.
Figure 14:
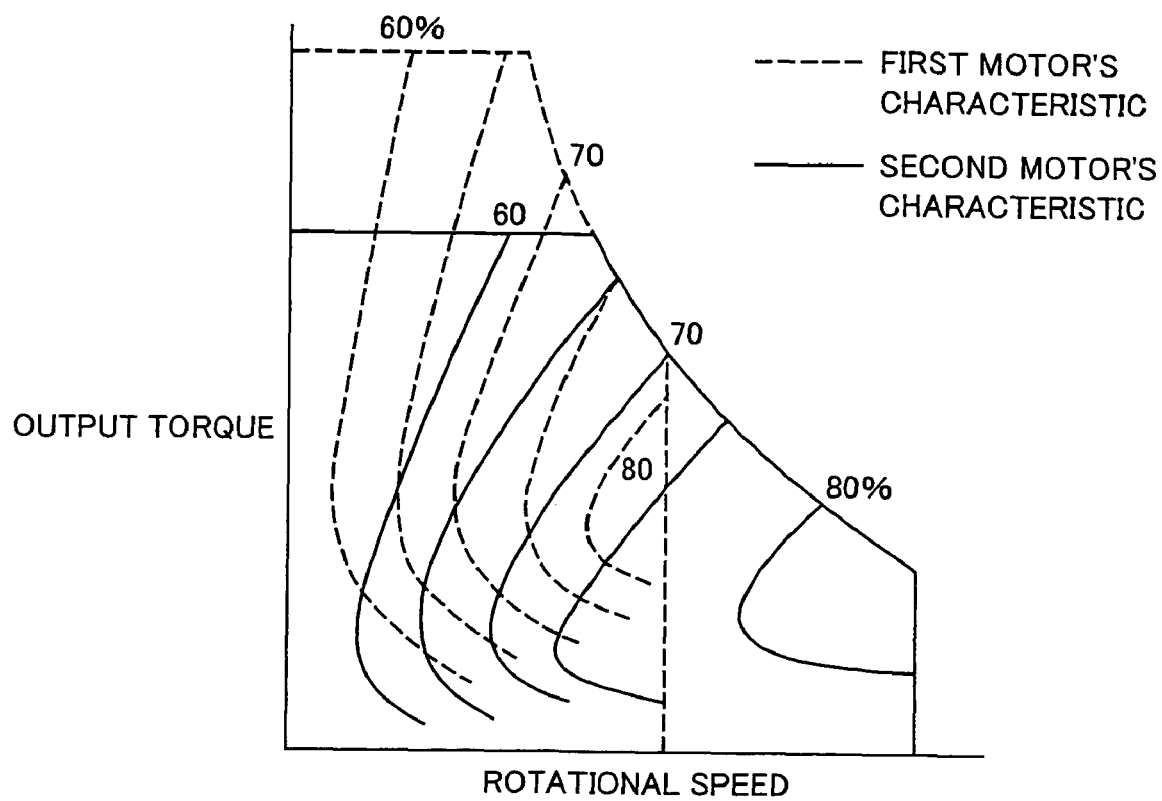
FIG. 14 is an efficiency map of the electric motor device described in the Japanese Patent Laying-Open No. 5-328529.

FIG. 13 is a schematic block diagram of a drive system of a vehicle having mounted therein a driving power control apparatus for a four wheel drive vehicle in an embodiment of the present invention.

With reference to FIG. 13, vehicle 110 is an FR based, hybrid four wheel drive vehicle having front left and right wheel units FL, FR as idler wheel units driven by motor generators MGL, MGR independently and rear left and right wheel units RL, RR as main drive wheel units driven by engine ENG and motor generator MG2. The hybrid four wheel drive vehicle has front left and right wheel units FL, FR driven by motor generators MGL, MGR independently and rear left and right wheel units RL, RR driven by engine ENG and motor generator MG2.

Note that vehicle 110 has mounted therein motor generators MG1, MG2, MGR, MGL and their drive devices and a variety of sensors that are all similar in configuration to those of the FIG. 1 vehicle 100. Furthermore, motor generators MG2, MGR, MGL have characteristics, respectively, in efficiency with respect to torque output therefrom and vehicular speed that are equivalent to the FIG. 5 characteristics. Accordingly they will not be described repeatedly in detail.

In vehicle 110 thus configured, when a driving power is allocated between engine ENG and all of motor generators MG2, MGR, MGL for required vehicular driving power Pttl and the motors' required driving power PMreq* is determined, then a method similar to that described above at items [1], [2] is employed to determine how a drive torque should be allocated between motor generators MG2, MGR, MGL.

Herein in the present exemplary variation the drive torque is allocated as determined in a method that is characterized in that a drive torque allocated to motor generators MGR, MGL is not necessarily limited to less than 50% of the motors' required drive torque TM*. Thus a degree of freedom in allocating a drive torque between motor generators MG2, MGR, MGL is increased to be larger than that for an FF based four wheel drive vehicle 100. As a result the motor generators' total efficiency can further be improved.

A drive torque allocated to front left and right wheel units FL, FR serving as idler wheel units is not limited, as described above, because vehicle 110 does not have a large possibility to destabilize in behavior if the FR based four wheel drive vehicle having rear left and right wheel units RL, RR as main drive wheel units is urgently altered to be FF based with front left and right wheel units FL, FR serving as main drive wheel units as a result of prioritizing efficiency.

More specifically, if efficiency is prioritized and the drive torque of motor generators MGR, MGL is determined at least 50% of the motors' required drive torque TM*, then vehicle 110 will substantially be altered to an FF based four wheel drive vehicle.

An FR based four wheel drive vehicle has a cornering ability inherently having a large tendency to oversteer and thus readily destabilizing. Accordingly, an increased tendency to understeer varies the vehicle's cornering ability to, on the contrary, stabilize. Vehicle 110 can thus avoid destabilizing in behavior when it turns.

Thus when the present driving power control apparatus is applied to an FR based four wheel drive vehicle, limitation is not imposed on allocating a drive torque for an idler wheel unit, and in comparison with an FF based four wheel drive vehicle a larger degree of freedom can be achieved in allocating a drive torque between a main drive wheel unit and the idler wheel unit. As a result the FR based four wheel drive vehicle can further improve the motor generators' feasible, total drive efficiency and hence achieve further improved mileage.

It should be understood that the embodiments disclosed herein are illustrative and non-restrictive in any respect. The scope of the present invention is defined by the terms of the claims, rather than the description above, and is intended to include any modifications within the scope and meaning equivalent to the terms of the claims.

INDUSTRIAL APPLICABILITY

The present invention is applicable to driving power control apparatuses mounted in four wheel drive vehicles.

The invention claimed is:

1. A driving power control apparatus for a four wheel drive vehicle having first left and right drive wheel units and second left and right drive wheel units, comprising:
   a first motor;
   a first power transmission mechanism transmitting a motive power generated by the first motor to the first left and right drive wheel units, the first left and right drive wheel units being coupled to a first drive shaft;

two second motors, a first one of the second motors being coupled to the second left drive wheel unit, and a second one of the second motors being coupled to the right drive wheel unit, and being drivable independently from each other, and exhibiting a maximum efficiency in a different output range than the first motor;

a second power transmission mechanism transmitting motive powers generated by the two second motors to the second left and right drive wheel units, respectively;

a first drive circuit receiving electric power from a power supply to control driving of the first motor;

two second drive circuits receiving electric power from the power supply to control driving of the two second motors, respectively;

a driving power allocation determination unit that determines an allocation of an output, between the first motor and the two second motors of a driving power, that the first and second motors as a whole are required to output; and a driving control unit that controls the first and second drive circuits to cause the first motor and the two second motors to output their respective, allocated driving powers, wherein:

at least one of the first and second power transmission mechanisms includes a speed reducer that transmits the motive power generated by an associated motor of the first motor and the two second motors to an associated drive wheel unit of the drive wheel units such that the speed reducer reduces a rotational speed of the motive power; and the driving power allocation determination unit includes:
 a storage device for previously converting a characteristic of efficiency of each of the first motor and the two second motors with respect to each of the first motor's and the two second motors' torque and each of the first motor's and the two second motors' rotational speed into a characteristic of efficiency of each of the first and second motors with respect to each of the first motor's and the two second motors' torque and vehicular speed, and storing the characteristic of efficiency thus converted; and
 a first allocation determination device for determining the allocation of the output between the first motor and the two second motors, as based on a drive torque and a vehicular speed that the first motor and the two second motors as a whole are required to output, and based on the characteristic of efficiency, as stored, of each of the first motor and the two second motors with respect to its torque and vehicular speed, to allow the first motor and the two second motors to output torques that satisfy in total the drive torque that the first motor and the two second motors as a whole are required to output, and also to allow a total efficiency of the first motor and the two second motors to be greater than or equal to a predetermined threshold value.

2. The driving power control apparatus for a four wheel drive vehicle according to claim 1, further comprising:
 a driving power detection unit detecting a driving power that the first motor and the two second motors as a whole are required to output; and
 a vehicular speed detection unit detecting the vehicular speed, wherein
the first allocation determination device includes a storage unit for previously setting and storing therein an allocation of the output between the first motor and the two second motors that maximizes the total efficiency of the first motor and the two second motors, as based on the characteristic of efficiency of each of the first motor and the two second motors with respect to each of the first motor's and the two second motors' torque and vehicular speed, for each combination of the drive torque and the vehicular speed that the first motor and the two second motors as a whole are required to output, and
the first allocation determination device extracts from the storage unit an allocation of the output between the first motor and the two second motors that corresponds to the drive torque, as detected, that the first motor and the two second motors as a whole are required to output, and to the vehicular speed as detected.

3. The driving power control apparatus for a four wheel drive vehicle according to claim 2, further comprising a steering angle detection unit detecting a steering angle of the vehicle, wherein
the first allocation determination device corrects, based on the steering angle of the vehicle as detected, the allocation of the output between the first motor and the two second motors as determined.

4. The driving power control apparatus for a four wheel drive vehicle according to claim 2, further comprising a wheel unit slip detection unit detecting that the first and second left and right drive wheel units slip, wherein:
when the wheel unit slip detection unit detects that either the first or second left and right drive wheel units slip, the first allocation determination device corrects the allocation of the output between the first motor and the two second motors as determined.

5. The driving power control apparatus for a four wheel drive vehicle according to claim 1, wherein the driving power allocation determination unit further includes:
 an evaluation device for obtaining an evaluation value indicating a level of stability in a behavior of the vehicle for each combination of the drive torque that the first motor and the two second motors as a whole are required to output and the vehicular speed, as based on the allocation of the output between the first motor and the two second motors and on a condition that the vehicle is traveling;
 a second allocation determination device for selecting at least one allocation of the output between the first motor and the two second motors, as based on the drive torque that the first motor and the two second motors as a whole are required to output and the vehicular speed and on the characteristic of efficiency, as converted, of each of the first motor and the two second motors with respect to each of the first motor's and the two second motors' torque and vehicular speed, such that a total sum of the torques output from the first motor and the two second motors satisfies the drive torque that the first motor and the two second motors as a whole are required to output and the total efficiency of the first motor and the two second motors is greater than or equal to the predetermined threshold value, and for determining as the allocation of the output between the first motor and the two second motors an allocation of the at least one allocation selected that maximizes the evaluation value in accordance with the condition that the vehicle is traveling; and
 a select device externally operable for selecting one of the first and second allocation determination device in accordance with how the select device is operated.

6. The driving power control apparatus for a four wheel drive vehicle according to claim 1, further comprising:

a voltage conversion circuit converting voltage between the power supply and the first drive circuit;

a closed first switch circuit configured to supply the second drive circuits with a voltage from the power supply directly; and closed second switch circuit configured to supply the second drive circuits with a voltage output from the voltage conversion circuit, wherein the driving power allocation determination unit further includes:

a calculation device for calculating a target value for the voltage input to the second drive circuits, as based on the driving power allocated to the two second motors;

a first opening/closing control device for closing the first switch circuit and also opening the second switch circuit, the first opening/closing control device being configured to operate when the target value, as calculated, is less than or equal to the voltage received from the power supply; and a second opening/closing control device for opening the first switch circuit and also closing the second switch circuit, the second opening/closing control device being configured to operate when the target value, as calculated, is greater than the voltage received from the power supply.

7. The driving power control apparatus for a four wheel drive vehicle according to claim 1, wherein the first left and right drive wheel units are configured to operate front wheel units of the vehicle and the second left and right drive wheel units are configured to operate rear wheel units of the vehicle.

8. The driving power control apparatus for a four wheel drive vehicle according to claim 1, wherein the first left and right drive wheel units are configured to operate rear wheel units of the vehicle and the second left and right drive wheel units are configured to operate front wheel units of the vehicle.

9. The driving power control apparatus for a four wheel drive vehicle according to claim 1, wherein the two second motors are each an in-wheel motor.

10. The driving power control apparatus for a four wheel drive vehicle according to claim 1, wherein:

the vehicle is a hybrid vehicle;

the first power transmission mechanism provides a composition of a motive power generated by an internal combustion engine and the motive power generated by the first motor and transmits the composition to the first left and right drive wheel units coupled to the first drive shaft; and the driving power allocation determination unit determines an allocation of an output between the internal combustion engine and the first motor and the two second motors of a driving power that the vehicle is required to output, and the driving power allocation determination unit also determines an allocation of the output between the first motor and the two second motors for a driving power, as determined, that the first motor and the two second motors as a whole are required to output.

11. The driving power control apparatus for a four wheel drive vehicle according to claim 1, wherein the speed reducer is configured to apply different speed reduction ratios to the motive power generated by the first motor and transmitted to the first left and right drive wheel units and those generated by the two second motors and transmitted to the second left and right drive wheel units, respectively.

* * * * *